United States Patent [19]
Tada et al.

[11] Patent Number: 5,745,745
[45] Date of Patent: Apr. 28, 1998

[54] TEXT SEARCH METHOD AND APPARATUS FOR STRUCTURED DOCUMENTS

[75] Inventors: Katsumi Tada, Yokohama; Atsushi Hatakeyama, Kawasaki; Hisamitsu Kawaguchi, Sagamihara; Natsuko Mizutani, Kawasaki; Kanji Kato, Tokorazawa; Satoshi Asakawa, Hirakata, all of Japan

[73] Assignee: Hitachi, Ltd., Tokyo, Japan

[21] Appl. No.: 495,232

[22] Filed: Jun. 27, 1995

[30] Foreign Application Priority Data

Jun. 29, 1994 [JP] Japan ................................... 6-147399
Nov. 17, 1994 [JP] Japan ................................... 6-308201

[51] Int. Cl.⁶ ........................................................ G06F 17/30
[52] U.S. Cl. ........................... 395/601; 395/605; 395/606
[58] Field of Search ................................. 395/605, 606, 395/601; 364/419.9, 900, 519; 389/54

[56] References Cited

U.S. PATENT DOCUMENTS

| | | | |
|---|---|---|---|
| 4,651,288 | 3/1987 | Zeising | 364/519 |
| 4,839,853 | 6/1989 | Deerwester et al. | 364/900 |
| 5,168,533 | 12/1992 | Kato et al. | 382/54 |
| 5,168,565 | 12/1992 | Morita | 395/600 |
| 5,220,625 | 6/1993 | Hatakeyama et al. | 382/54 |
| 5,265,065 | 11/1993 | Turtle | 395/600 |
| 5,297,042 | 3/1994 | Morita | 364/419.19 |
| 5,398,338 | 3/1995 | Yoshida | 395/600 |
| 5,418,946 | 5/1995 | Mori | 395/600 |
| 5,454,105 | 9/1995 | Hatakeyama et al. | 395/600 |
| 5,469,354 | 11/1995 | Hatakeyama et al. | 364/419.19 |
| 5,488,725 | 1/1996 | Turtle et al. | 395/600 |
| 5,579,519 | 11/1996 | Pelletier | 395/705 |

FOREIGN PATENT DOCUMENTS

3-174652  7/1991  Japan .

OTHER PUBLICATIONS

Arikawa, Setsuo, et al. "A Text Database Management System SIGMA and Its Usage," Study Report of Information Processing Society of Japan, vol. 89, No. 66, Jul. 27, 1989, pp. 1–8. (English Abstract included).

"SGML and Full–Text Database," Information Science and Technology, vol. 43, No. 12, 1993, pp. 1097–1103. (English translation unavailable).

"Practical SGML", Eric van Herwijen, Kluwer Academic Publishers, 1990.

*Primary Examiner*—Thomas G. Black
*Assistant Examiner*—Frantz Coby
*Attorney, Agent, or Firm*—Fay Sharpe Beall Fagan Minnich & McKee

[57] ABSTRACT

A text search method for structured documents and apparatus wherein structured document database to be searched is created by adding logical structure length information to logical structure discriminating information on the basis of a structured document constituted by a plurality of logical structures and logical structure discriminator information, and in searching the structured document database in accordance with an entered search key constituted by a logical structure and a search character string, the search of a logical structure other than the entered logical structure is skipped based upon the data length information. In the method and apparatus, by using a structured document, structured document database to be searched is created which is constituted by a condensed text for each logical structure constituted by a list of words contained in the logical structure, a character occurrence bitmap for each logical structure constituted by a list of characters contained in the logical structure and an source structured document, and then the structured document database is searched in accordance with an entered search key constituted by a logical structure and a search character string. An source structured document is searched optionally depending upon the entered search key.

22 Claims, 37 Drawing Sheets

FIG.4

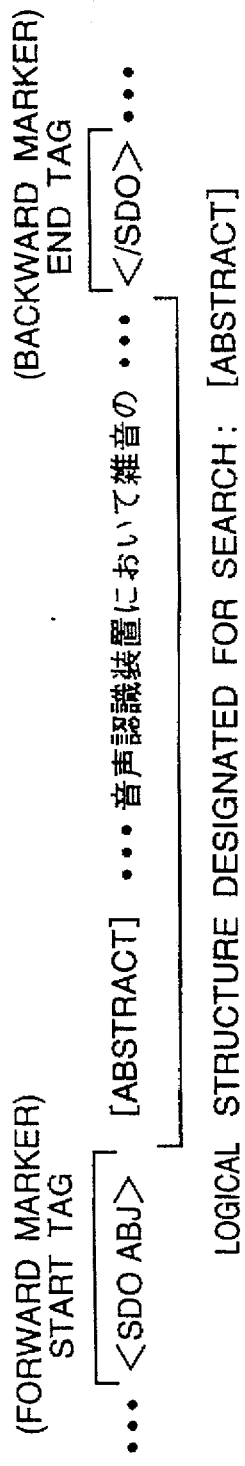

(FORWARD MARKER) START TAG: `<SDO ABJ>`

[ABSTRACT] ···音声認識装置において雑音の··· [ABSTRACT]

(BACKWARD MARKER) END TAG: `</SDO>`

LOGICAL STRUCTURE DESIGNATED FOR SEARCH: [ABSTRACT]

SEARCH CONDITION: SEARCH TEXT CONTAINING "音声認識" IN [ABSTRACT]

=> SEARCH TEXT CONTAINING "音声認識" BETWEEN "`<SDO ABJ>`" AND "`</SDO>`"

=> SEARCH SOURCE TEXT CONTAINING "`<SDO ABJ>`*音声認識*`</SDO>`"

(*: METACHARACTER)

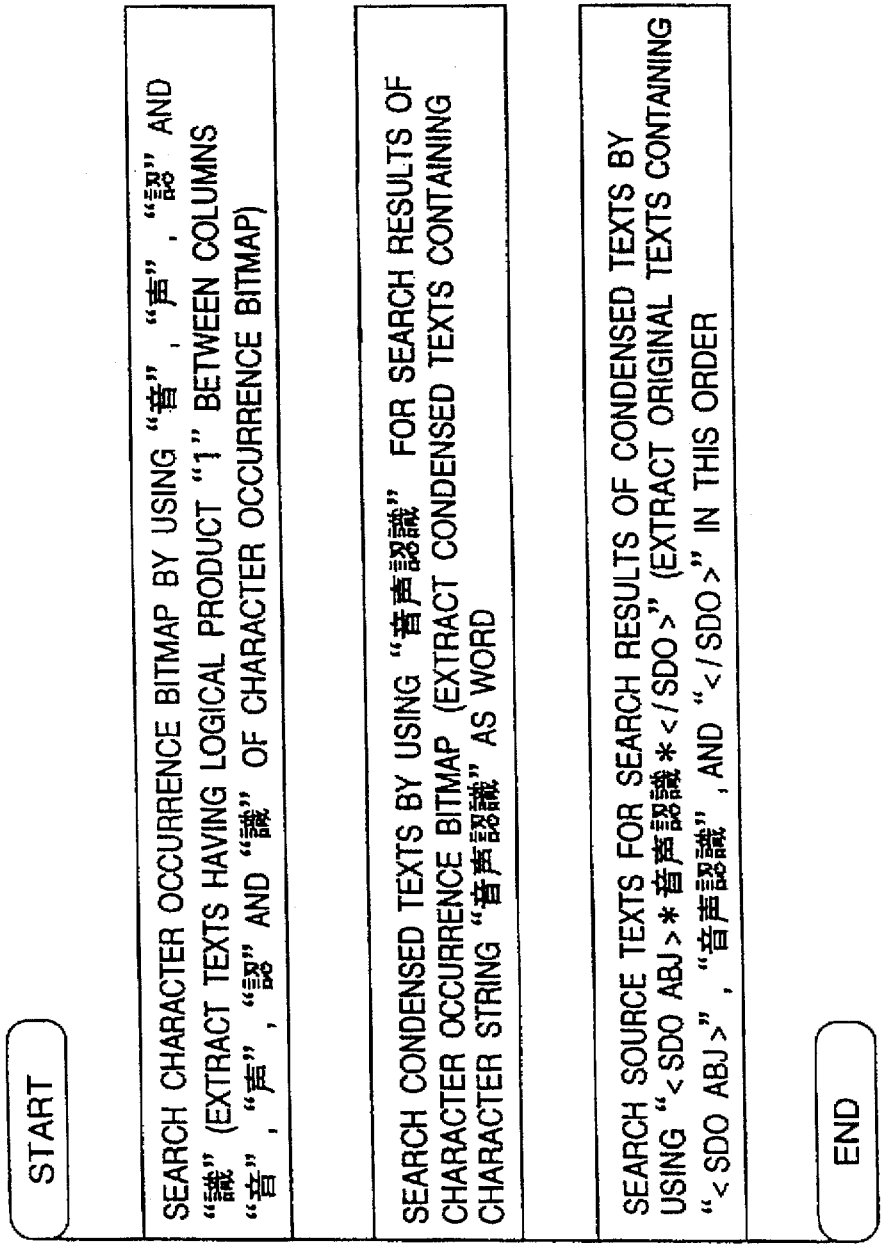

FIG.5

SEARCH CONDITION: SEARCH TEXTS CONTAINING "音声認識"
IN LOGICAL STRUCTURE [ABSTRACT]

START

SEARCH CHARACTER OCCURRENCE BITMAP BY USING "音", "声", "認", "識" (EXTRACT TEXTS HAVING LOGICAL PRODUCT "1" BETWEEN COLUMNS "音", "声", "認" AND "識" OF CHARACTER OCCURRENCE BITMAP)

SEARCH CONDENSED TEXTS BY USING "音声認識" FOR SEARCH RESULTS OF CHARACTER OCCURRENCE BITMAP (EXTRACT CONDENSED TEXTS CONTAINING CHARACTER STRING "音声認識" AS WORD

SEARCH SOURCE TEXTS FOR SEARCH RESULTS OF CONDENSED TEXTS BY USING "<SDO ABJ>＊音声認識＊</SDO>" (EXTRACT ORIGINAL TEXTS CONTAINING "<SDO ABJ>", "音声認識", AND "</SDO>" IN THIS ORDER

END

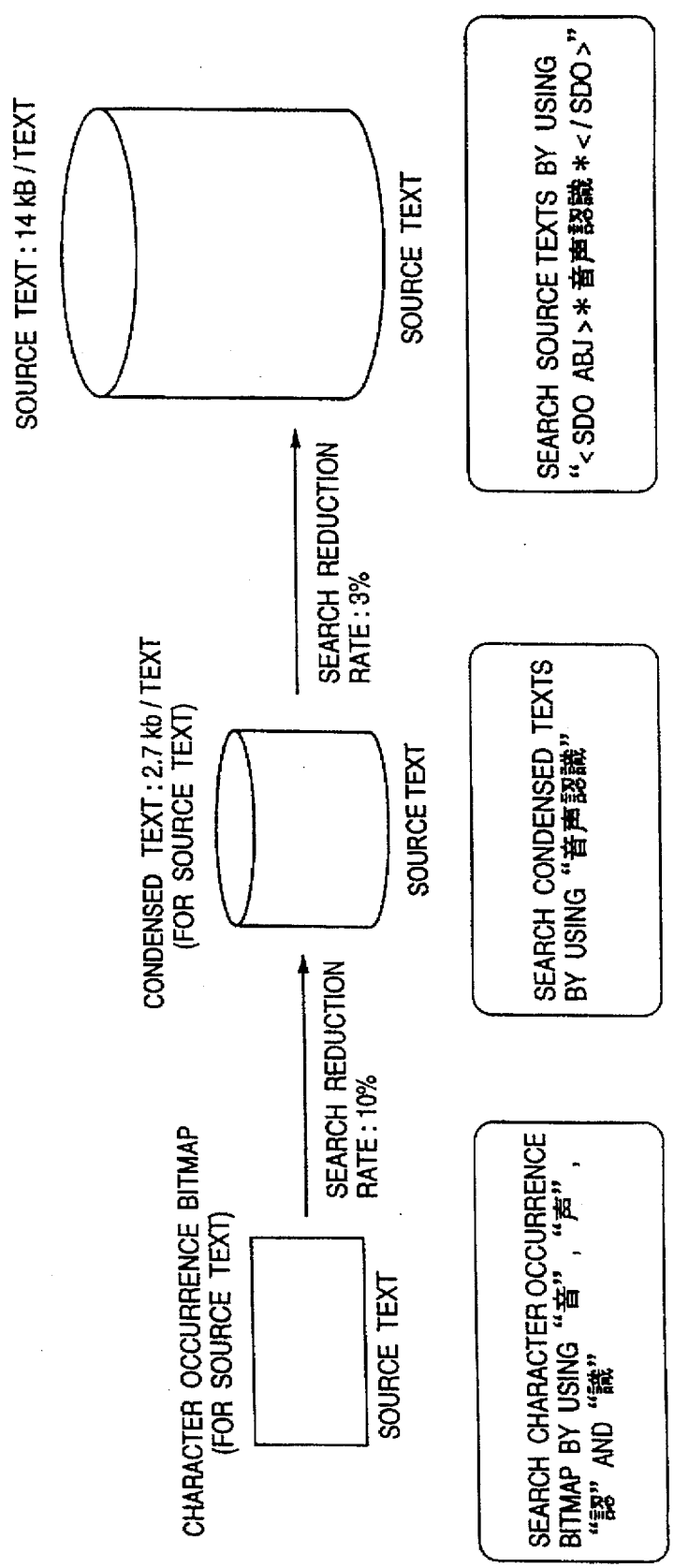

FIG.9

(LOGICAL STRUCTURE OF TECHNICAL REPORT)

TITLE
- < TITLE >
- 枠接触文字の認識精度向上方式
- < / TITLE >

INTRODUCTION
- < INTRODUCTION >
- 文学枠に接触した文字を高精度に分離する技術を開発した・・・
- < / INTRODUCTION >

BACKGROUND
- < BACKGROUND >
- 印刷された文書情報の有効利用・・・
- < / BACKGROUND >

CHAPTER TITLE
- < CHAPTER TITLE >
- 枠除去方式の検討
- < / CHAPTER TITLE >

CHAPTER TEXT
- < CHAPTER TEXT >
- 筆者は文字枠に接触した文字を分離する・・・
- < / CHAPTER TEXT >

CONCLUSION
- < CONCLUSION >
- ・・・文字認識精度を向上することができた。
- < / CONCLUSION >

FIG.11

| LOGICAL STRUCTURE NAME | LOGICAL STRUCTURE DISCRIMINATOR | CONDENSED TEXT IDENTIFICATION NUMBER | CONDENSED TEXT FILE NAME |
|---|---|---|---|
| TITLE | TITLE | 1 | file001 |
| INTRODUCTION | INTRODUCTION | 2 | file002 |
| BACKGROUND | BACKGROUND | 3 | file003 |
| CHAPTER TITLE | CHAPTER TITLE | 4 | file004 |
| CHAPTER TEXT | CHAPTER TEXT | 5 | file005 |
| CONCLUSION | CONCLUSION | 6 | file006 |

FIG.12

ORIGINAL TEXT

< TITLE >
枠接触文字の認識精度向上方式
< /TITLE >
< INTRODUCTION >
文字枠に接触した文字を高精度に
分離する技術を開発した・・・
< /INTRODUCTION >
< BACKGROUND >
印刷された文書情報の有効利用・・・
< /BACKGROUND >
< CHAPTER TITLE >
枠除去方式の検討
< /CHAPTER TITLE >
< CHAPTER TEXT >
筆者は文字枠に接触した文字を
分離する・・・
< /CHAPTER TEXT >
< CONCLUSION >
・・・文字認識精度を向上することが
できた。
< /CONCLUSION >

REGISTER SOURCE TEXT ITSELF IN SOURCE TEXT FILE

CONDENCED TEXT

| 枠接触文字 | 認識精度向上方式 |

TITLE (LOGICAL STRUCTURE IDNETIFICATION NUMBER:1)

| 文字枠 | 接触 | 高精度 | 分離 | 技術 |
| 開発 | ・・・ |

INTRODUCTION (LOGICAL STRUCTURE IDNETIFICATION NUMBER:2)

| 印刷 | 文書情報 | 有効利用 | ・・・ |

BACKGROUND (LOGICAL STRUCTURE IDNETIFICATION NUMBER:3)

| 枠除去方式 | 検討 |

CHAPTER TITLE (LOGICAL STRUCTURE IDNETIFICATION NUMBER:4)

| 筆者 | 文字枠 | 接触 | 分離 | ・・・ |

CHAPTER TEXT (LOGICAL STRUCTURE IDNETIFICATION NUMBER:5)

| ・・・ | 文字認識精度 | 向上 |

CONCLUSION (LOGICAL STRUCTURE IDNETIFICATION NUMBER:6)

CREATE CONDENSER TEXT FILE OF EACH LOGICAL STRUCTURE

CHARACTER OCCURRENCE BITMAP

| ・・・ | "文" | ・・・ | "字" | ・・・ | "認" | ・・・ | "識" | ・・・ |
| ・・・ | 1 | ・・・ | 1 | ・・・ | 1 | ・・・ | 1 | ・・・ |

CREATE CHARACTER OCCURRENCE BITMAP FOR SOURCE TEXT

FIG.14 CONDENCED TEXT

ORIGINAL TEXT

```
< TITLE >
枠接触文字の認識精度向上方式
</ TITLE >
< INTRODUCTION >
文字枠に接触した文字を高精度に
分離する技術を開発した・・・
</ INTRODUCTION >
< BACKGROUND >
印刷された文書情報の有効利用
</ BACKGROUND >
< CHAPTER TITLE >
枠除去方式の検討
</ CHAPTER TITLE >
< CHAPTER TEXT >
筆者は文字枠に接触した文字を
分離する・・・
</ CHAPTER TEXT >
< CONCLUSION >
・・・文字認識精度を向上すること
ができた。
</ CONCLUSION >
```

CONDENCED TEXT

| 枠接触文字 | 認識精度向上 |
|---|---|

TITLE (LOGICAL STRUCTURE IDNETIFICATION NUMBER:1)

| 文字枠 | 接触 | 高精度 | 分離 | 技術 |
|---|---|---|---|---|
| 開発 | ・・・ | | | |

INTRODUCTION (LOGICAL STRUCTURE IDNETIFICATION NUMBER:2)

| 印刷 | 文書情報 | 有効利用 |
|---|---|---|

BACKGROUND (LOGICAL STRUCTURE IDNETIFICATION NUMBER:3)

| 枠除去方式 | 検討 |
|---|---|

CHAPTER TITLE (LOGICAL STRUCTURE IDNETIFICATION NUMBER:4)

| 筆者 | 文字枠 | 接触 | 分離 | ・・・ |
|---|---|---|---|---|

CHAPTER TEXT (LOGICAL STRUCTURE IDNETIFICATION NUMBER:5)

| ・・・ | 文字認識精度 | 向上 |
|---|---|---|

CONCLUSION (LOGICAL STRUCTURE IDNETIFICATION NUMBER:6)

(SEARCH CONDENSER TEXT FILE FOR [CONCLUSION])

CHARACTER OCCURRENCE BITMAP

| ・・・ | "文" | ・・・ | "字" | ・・・ | "認" | "識" | ・・・ |
|---|---|---|---|---|---|---|---|
| ・・・ | 1 | ・・・ | 1 | ・・・ | 1 | 1 | ・・・ |

(SEARCH CHARACTER OCCURRENCE BITMAP FOR [CONCLUSION])

FIG.15

| LOGICAL STRUCTURE NAME | | LOGICAL STRUCTURE DISCRIMINATOR | LOGICAL STRUCTURE IDENTIFICATION NUMBER | | CONDENSED TEXT FILE NAME |
|---|---|---|---|---|---|
| LEVEL 1 | LEVEL 2 | | LEVEL 1 | LEVEL 2 | |
| BIBLIOGRAPHY | — | BIBLIOGRAPHY | 1 | 0 | file010 |
| BIBLIOGRAPHY | TITLE | TITLE | 1 | 1 | file011 |
| BIBLIOGRAPHY | WRITTEN DATE | WRITTEN DATE | 1 | 2 | file012 |
| BIBLIOGRAPHY | AUTHOR NAME | AUTHOR NAME | 1 | 3 | file013 |
| SOURCE TEXT | — | SOURCE TEXT | 2 | 0 | file020 |
| SOURCE TEXT | INTRODUCTION | INTRODUCTION | 2 | 1 | file021 |
| SOURCE TEXT | CHAPTER TITLE | CHAPTER TITLE | 2 | 2 | file022 |
| SOURCE TEXT | CHAPTER TEXT | CHAPTER TEXT | 2 | 3 | file023 |
| ... | ... | ... | ... | ... | ... |

FIG.16

CONDENCED TEXT

| 枠接触文字 | 認識精度向上方式 |

TITLE (LOGICAL STRUCTURE IDENTIFICATION NUMBER : 1)

| 文字枠 | 接触 | 高精度 | 分離 | 技術 |
| 開発 | ... | | | |

INTRODUCTION (LOGICAL STRUCTURE IDENTIFICATION NUMBER : 2)

| 印刷 | 文書情報 | 有効利用 | ... |

BACKGROUND (LOGICAL STRUCTURE IDENTIFICATION NUMBER : 3)

| 枠除去方式 | 検討 |

CHAPTER TITLE (LOGICAL STRUCTURE IDENTIFICATION NUMBER : 4)

| 筆者 | 文字枠 | 接触 | 分離 | ... |

CHAPTER TEXT (LOGICAL STRUCTURE IDENTIFICATION NUMBER : 5)

| ... | 文字認識精度 | 向上 |

CONCLUSION (LOGICAL STRUCTURE IDENTIFICATION NUMBER : 6)

ORIGINAL TEXT

< TITLE >
枠接触文字の認識精度向上方式
< / TITLE >
< INTRODUCTION >
文字枠に接触した文字を高精度に
分離する技術を開発した・・・
< / INTRODUCTION >
< BACKGROUND >
印刷された文書情報の有効利用・・・
< / BACKGROUND >
< CHAPTER TITLE >
枠除去方式の検討
< / CHAPTER TITLE >
< CHAPTER TEXT >
筆者は文字枠に接触した文字を
分離する・・・
< / CHAPTER TEXT >
< CONCLUSION >
・・・文字認識精度を向上すること
ができた。
< / CONCLUSION >

SEARCH CONDENSER TEXT FILE FOR [CONCLUSION]

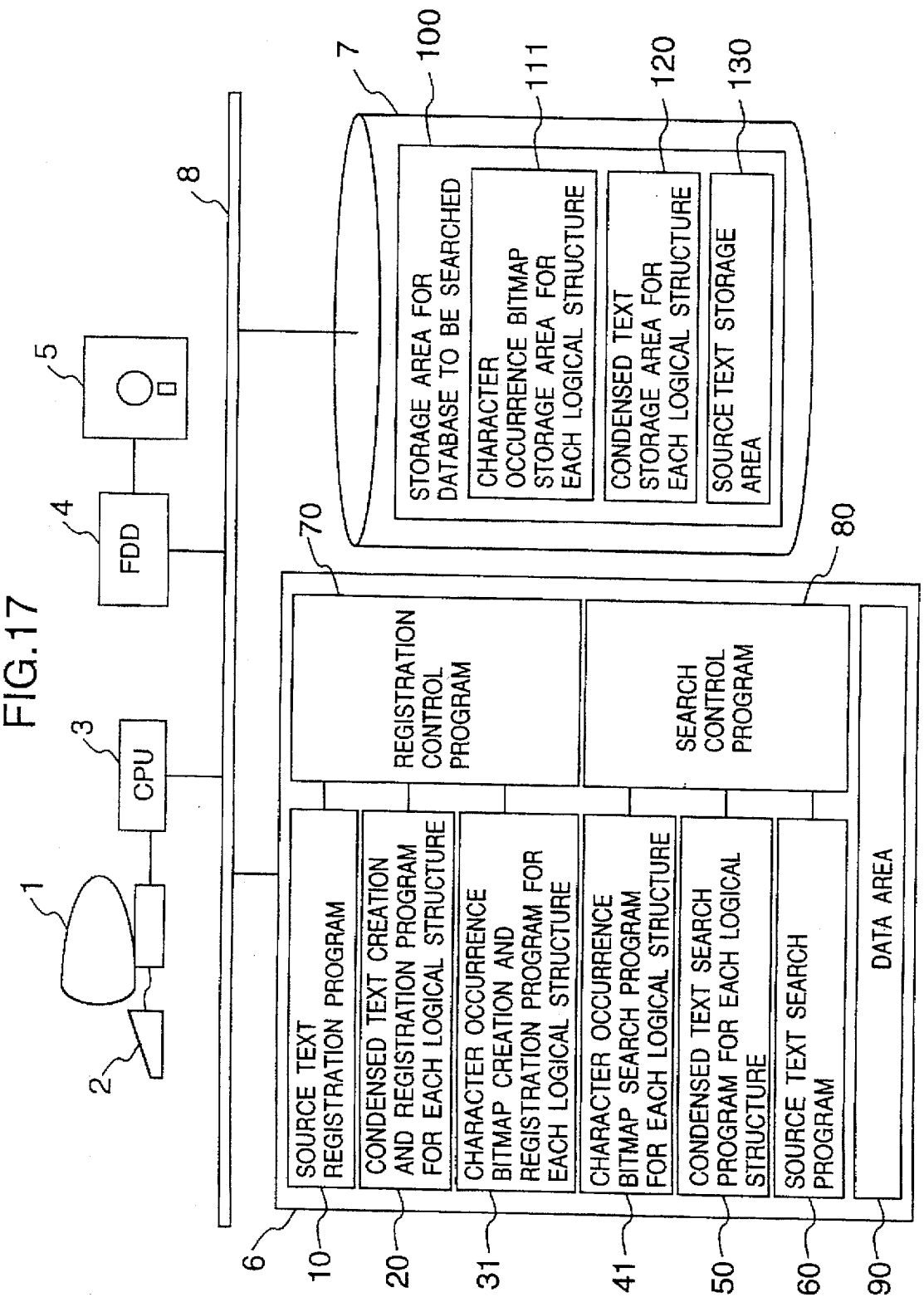

FIG. 18

CHARACTER OCCURRENCE BITMAP

... "文" ... "字" ... "認" ...

| ... | 1 | ... | 1 | ... | 1 | ... |
|---|---|---|---|---|---|---|

TITLE (LOGICAL STRUCTURE IDENTIFICATION NUMBER: 1)

| ... | 1 | ... | 1 | ... | 0 | ... |
|---|---|---|---|---|---|---|

INTRODUCTION (LOGICAL STRUCTURE IDENTIFICATION NUMBER: 2)

| ... | 1 | ... | 0 | ... | 0 | ... |
|---|---|---|---|---|---|---|

BACKGROUND (LOGICAL STRUCTURE IDENTIFICATION NUMBER: 3)

| ... | 0 | ... | 0 | ... | 0 | ... |
|---|---|---|---|---|---|---|

CHAPTER TITLE (LOGICAL STRUCTURE IDENTIFICATION NUMBER: 4)

| ... | 1 | ... | 0 | ... | 0 | ... |
|---|---|---|---|---|---|---|

CHAPTER TEXT (LOGICAL STRUCTURE IDENTIFICATION NUMBER: 5)

| ... | 1 | ... | 1 | ... | 1 | ... |
|---|---|---|---|---|---|---|

CONCLUSION (LOGICAL STRUCTURE IDENTIFICATION NUMBER: 6)

[SEARCH CHARACTER OCCURRENCE BITMAP FOR [CONCLUSION]]

CONDENSED TEXT

| 枠接触文字 | 認識精度向上方式 |
|---|---|

TITLE (LOGICAL STRUCTURE IDENTIFICATION NUMBER: 1)

| 文字枠 | 接触 | 高精度 | 分離 | 技術 |
|---|---|---|---|---|
| 開発 | ... | | | |

INTRODUCTION (LOGICAL STRUCTURE IDENTIFICATION NUMBER: 2)

| 印刷 | 文書情報 | 有効利用 | ... |
|---|---|---|---|

BACKGROUND (LOGICAL STRUCTURE IDENTIFICATION NUMBER: 3)

| 枠除去方式 | 検討 |
|---|---|

CHAPTER TITLE (LOGICAL STRUCTURE IDENTIFICATION NUMBER: 4)

| 筆者 | 文字枠 | 接触 | 分離 | ... |
|---|---|---|---|---|

CHAPTER TEXT (LOGICAL STRUCTURE IDENTIFICATION NUMBER: 5)

| ... | 文字認識精度 | 向上 |
|---|---|---|

CONCLUSION (LOGICAL STRUCTURE IDENTIFICATION NUMBER: 6)

[SEARCH CONDENSER TEXT FILE FOR [CONCLUSION]]

ORIGINAL TEXT

\<TITLE\>
枠接触文字の認識精度向上方式
\</TITLE\>
\<INTRODUCTION\>
文字枠に接触した文字を高精度に分離する技術を開発した・・・
\</INTRODUCTION\>
\<BACKGROUND\>
印刷された文書情報の有効利用・・・
\</BACKGROUND\>
\<CHAPTER TITLE\>
枠除去方式の検討
\</CHAPTER TITLE\>
\<CHAPTER TEXT\>
筆者は文字枠に接触した文字を分離する・・・
\</CHAPTER TEXT\>
\<CONCLUSION\>
・・・文字認識精度を向上することができた。
\</CONCLUSION\>

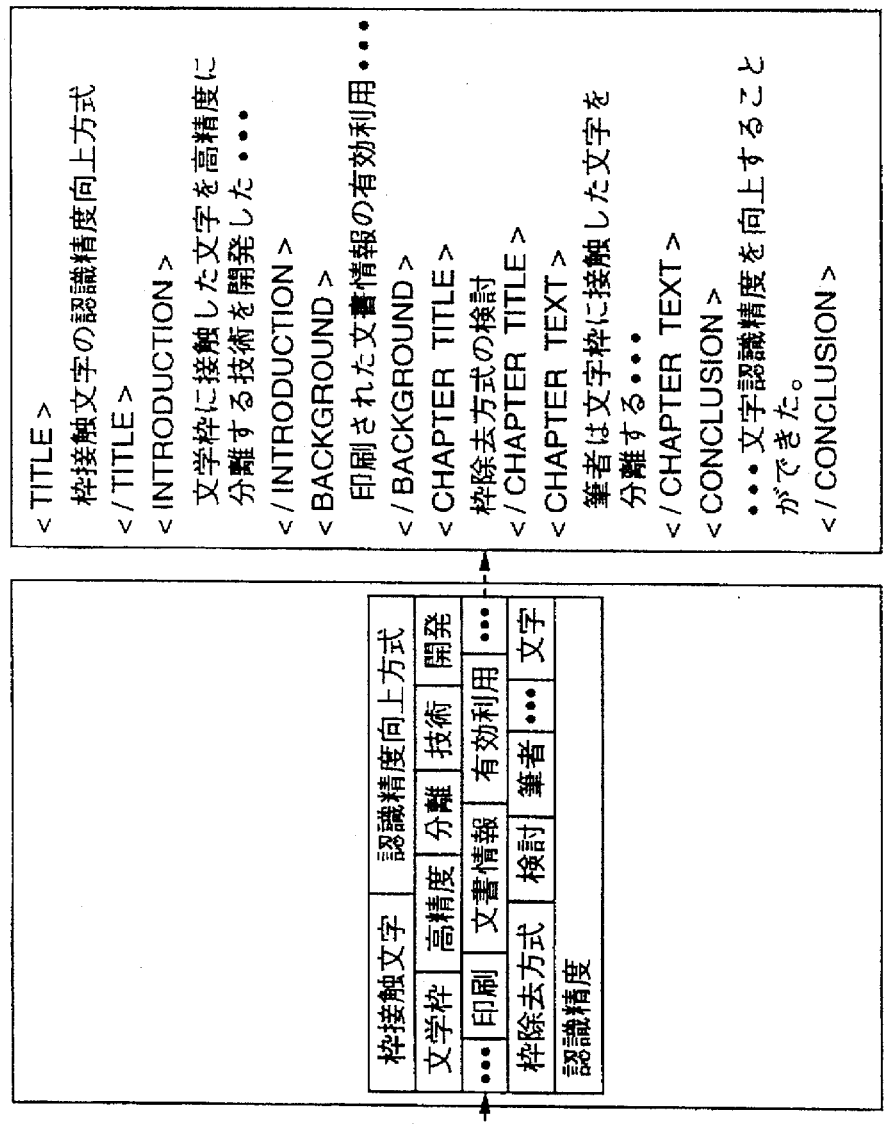

FIG.21

CHARACTER OCCURRENCE BITMAP

| | ..."文" | ..."字" | ..."認" | ..."識" | ... |
|---|---|---|---|---|---|
| ... | 1 | ... | 1 | ... | 1 | ... |

TITLE (LOGICAL STRUCTURE IDENTIFICATION NUMBER:1)

| ... | 1 | ... | 0 | ... | 0 | ... |

INTRODUCTION (LOGICAL STRUCTURE IDENTIFICATION NUMBER:2)

| ... | 1 | ... | 0 | ... | 0 | ... |

BACKGROUND (LOGICAL STRUCTURE IDENTIFICATION NUMBER:3)

| ... | 0 | ... | 0 | ... | 0 | ... |

CHAPTER TITLE (LOGICAL STRUCTURE IDENTIFICATION NUMBER:4)

| ... | 1 | ... | 1 | ... | 0 | ... |

CHAPTER TEXT (LOGICAL STRUCTURE IDENTIFICATION NUMBER:5)

| ... | 1 | ... | 1 | ... | 0 | ... |

CONCLUSION (LOGICAL STRUCTURE IDENTIFICATION NUMBER:6)

| ... | 1 | ... | 1 | ... | 1 | ... |

[SEARCH CHARACTER OCCURRENCE BITMAP FOR [CONCLUSION]]

ORIGINAL TEXT

<TITLE>
枠接触文字の認識精度向上方式
</TITLE>
<INTRODUCTION>
文字枠に接触した文字を高精度に分離する技術を開発した・・・
</INTRODUCTION>
<BACKGROUND>
印刷された文書情報の有効利用・・・
</BACKGROUND>
<CHAPTER TITLE>
枠除去方式の検討
</CHAPTER TITLE>
<CHAPTER TEXT>
筆者は文字枠に接触した文字を分離する・・・
</CHAPTER TEXT>
<CONCLUSION>
・・・文字認識精度を向上することができた。
</CONCLUSION>

FIG. 23

CHARACTER OCCURRENCE BITMAP

| ... | "文" | ... | "字" | ... | "認" | ... | "識" | ... |
|---|---|---|---|---|---|---|---|---|
| ... | 1 | ... | 1 | ... | 1 | ... | 1 | ... |

TITLE (LOGICAL STRUCTURE IDENTIFICATION NUMBER: 1)

| ... | 1 | ... | 0 | ... | 0 | ... | 0 | ... |

INTRODUCTION (LOGICAL STRUCTURE IDENTIFICATION NUMBER: 2)

| ... | 1 | ... | 0 | ... | 0 | ... | 0 | ... |

BACKGROUND (LOGICAL STRUCTURE IDENTIFICATION NUMBER: 3)

| ... | 0 | ... | 0 | ... | 0 | ... | 0 | ... |

CHAPTER TITLE (LOGICAL STRUCTURE IDENTIFICATION NUMBER: 4)

| ... | 1 | ... | 1 | ... | 0 | ... | 0 | ... |

CHAPTER TEXT (LOGICAL STRUCTURE IDENTIFICATION NUMBER: 5)

| ... | 1 | ... | 1 | ... | 0 | ... | 0 | ... |

CONCLUSION (LOGICAL STRUCTURE IDENTIFICATION NUMBER: 6)

| ... | 1 | ... | 1 | ... | 1 | ... | 1 | ... |

SEARCH CHARACTER OCCURRENCE BITMAP FOR [CONCLUSION]

---

CONDENSED TEXT

| 枠接触文字 | 認識精度向上方式 |

TITLE (LOGICAL STRUCTURE IDENTIFICATION NUMBER: 1)

| 文字枠 | 接触 | 高精度 | 分離 | 技術 |
| 開発 | ・・・ | | | |

INTRODUCTION (LOGICAL STRUCTURE IDENTIFICATION NUMBER: 2)

| 印刷 | 文書情報 | 有効利用 | ・・・ |

BACKGROUND (LOGICAL STRUCTURE IDENTIFICATION NUMBER: 3)

| 枠除去方式 | 検討 |

CHAPTER TITLE (LOGICAL STRUCTURE IDENTIFICATION NUMBER: 4)

| 筆者 | 文字枠 | 接触 | 分離 | ・・・ |

CHAPTER TEXT (LOGICAL STRUCTURE IDENTIFICATION NUMBER: 5)

| ・・・ | 文字認識精度 | 向上 |

CONCLUSION (LOGICAL STRUCTURE IDENTIFICATION NUMBER: 6)

SEARCH CONDENSED TEXT FILE FOR [CONCLUSION]

---

ORIGINAL TEXT

| 枠接触文字の認識精度向上方式 |

TITLE (LOGICAL STRUCTURE IDENTIFICATION NUMBER: 1)

| 文字枠に接触した文字を高精度に |
| 分離する技術を開発した。 |

INTRODUCTION (LOGICAL STRUCTURE IDENTIFICATION NUMBER: 2)

| 印刷された文書情報の有効利用・・・ |

BACKGROUND (LOGICAL STRUCTURE IDENTIFICATION NUMBER: 3)

| 枠除去方式の検討 |

CHAPTER TITLE (LOGICAL STRUCTURE IDENTIFICATION NUMBER: 4)

| 筆者は文字枠に接触した文字を・・・ |

CHAPTER TEXT (LOGICAL STRUCTURE IDENTIFICATION NUMBER: 5)

| ・・・文字認識精度を向上すること |
| ができた。 |

CONCLUSION (LOGICAL STRUCTURE IDENTIFICATION NUMBER: 6)

SEARCH SOURCE TEXT FILE FOR [CONCLUSION]

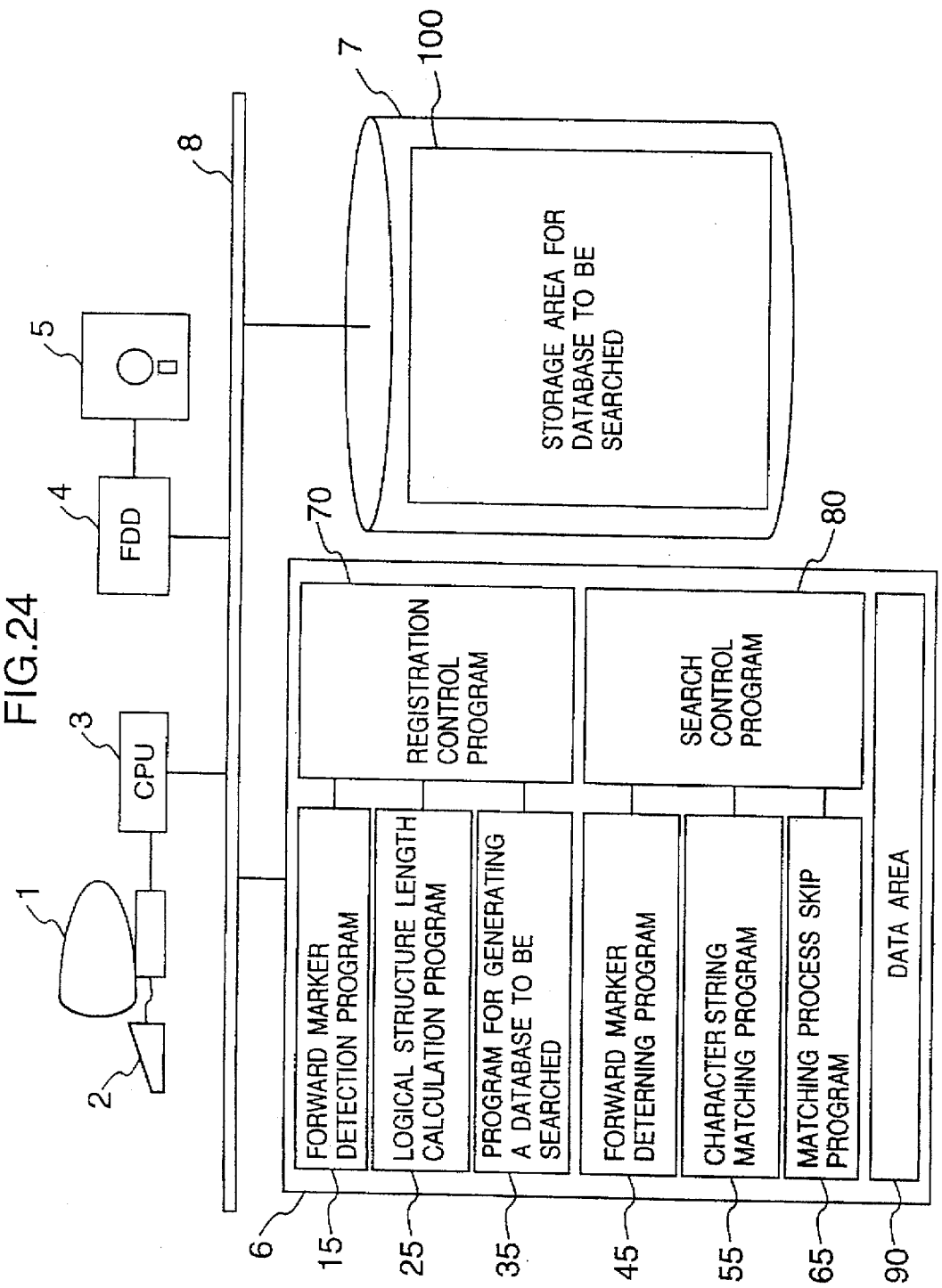

FIG.26

150 — (tot) [0001] — 200
⋮
160 — (eot)
⋮
150 — (tot) [1857] — 200
<TITLE> [0026] — 210
枠接触文字の認識精度向上方式
</TITLE>
<WRITTEN DATE> [0016] — 210
平成5年3月4日
</WRITTEN DATE>
<AUTHOR NAME> [0010] — 210
×× ××
</AUTHOR NAME>
<INTRODUCTION> [0636] — 210
文字枠に接触した文字を高精度に分離する技術
を開発した...
</INTRODUCTION>
<CHAPTER TITLE> [0018] — 210
枠除去方式の検討
</CHAPTER TITLE>
<CHAPTER TEXT> [0874] — 210
・・・
</CHAPTER TEXT>
⋮
<CONCLUSION> [0246] — 210
・・・文字認識精度を向上することができた。
</CONCLUSION>
160 — (eot)
150 — (tot) [1858] — 200
・・・
160 — (eot)
170 — (eof)

FIG.28

| LOGICAL STRUCTURE IDENTIFICATION NUMBER | LOGICAL STRUCTURE NAME | LOGICAL STRUCTURE DISCRIMINATOR |
|---|---|---|
| 1 | TITLE | TITLE |
| 2 | WRITTEN DATE | WRITTEN DATE |
| 3 | AUTHOR NAME | AUTHOR NAME |
| 4 | INTRODUCTION | INTRODUCTION |
| 5 | CHAPTER TITLE | CHAPTER TITLE |
| 6 | CHAPTER TEXT | CHAPTER TEXT |
| ... | ... | ... |

FIG.32

```
                              ┌ <TITLE>
                      TITLE   │ 枠接触文字の認識精度向上方式
                              └ </TITLE>
                              ┌ <WRITTEN DATE>
         ┌ WRITTEN DATA       │ 平成5年3月4日
         │                    └ </WRITTEN DATE>
BIBLIOGRAPHY                  ┌ <AUTHOR NAME>
         │    AUTHOR NAME     │
         │                    └ </AUTHOR NAME>
         └                    </BIBLIOGRAPHY>

</SOURCE TEXT>
                              ┌ <INTRODUCTION>
              INTRODUCTION    │ 文字枠に接触した文字を高精度に分離する技術
                              │ を開発した...
                              └ </INTRODUCTION>
                              ┌ <CHAPTER TITLE>
              CHAPTER TITLE   │ 枠除去方式の検討
         ┌                    └ </CHAPTER TITLE>
ORIGINAL TEXT                 ┌ <CHAPTER TEXT>
         │    CHAPTER TEXT    │ 筆者は文字枠に接触した文字を分離する...
         │                    └ </CHAPTER TEXT>
         │                    ┌ <CONCLUSION>
         │    CONCLUSION      │ ・・・文字認識精度を向上することができた。
         └                    └ </CONCLUSION>
```

FIG.33

| LOGICAL STRUCTURE IDENTIFICATION NUMBER | | LOGICAL STRUCTURE DISCRIMINATOR | LOGICAL STRUCTURE NAME | |
|---|---|---|---|---|
| LEVEL 2 | LEVEL 1 | | LEVEL 2 | LEVEL 1 |
| 0 | 1 | BIBLIOGRAPHY | — | BIBLIOGRAPHY |
| 1 | 1 | TITLE | TITLE | BIBLIOGRAPHY |
| 2 | 1 | WRITTEN DATE | WRITTEN DATE | BIBLIOGRAPHY |
| 3 | 1 | AUTHOR NAME | AUTHOR NAME | BIBLIOGRAPHY |
| 0 | 2 | SOURCE TEXT | — | SOURCE TEXT |
| 1 | 2 | INTRODUCTION | INTRODUCTION | SOURCE TEXT |
| 2 | 2 | CHAPTER TITLE | CHAPTER TITLE | SOURCE TEXT |
| 3 | 2 | CHAPTER TEXT | CHAPTER TEXT | SOURCE TEXT |
| ... | ... | ... | ... | ... |

TEXT SEARCH METHOD AND APPARATUS FOR STRUCTURED DOCUMENTS

BACKGROUND OF THE INVENTION

1. Field of the Invention

The present invention relates to a text search method for structured documents and apparatus for retrieving a target document constituted by a plurality of logical structures, such as a document described by Standard Generalized Makeup Language (SGML), at high speed by searching a subject logical structure, the method and apparatus being applied to a document information retrieval system.

2. Description of the Related Art

As the amount of information in society is developing more and more in recent years, the amount of electronic document information which is written by using word processors or personal computers is increasing rapidly. Under these circumstances, demands for a document retrieval system are increasing. The document retrieval system retrieves a target document containing a character string (hereinafter called a search term) designated by a user, from a database of documents constituted by character strings (hereinafter called texts).

Conventional document retrieval systems have used a full-text search scheme. Specifically, in the registration operation, texts are registered in a computer system in the form of database without changing the contents of the texts, and in the search operation, all the contents of texts registered in the text database are read to search a target text containing a designated search term.

With this full-text search scheme, the whole text file is scanned one character after another from the start of the file, as described in the top of Chapter 2 of "Basics of Information Science 14-7, Text Database Management System SIGMA and its Applications (1989, 7, 27)", Study Report of Information Processing Society of Japan, Vol.89, No.66 (hereinafter called Prior Art 1).

The following two problems are associated with this scheme if it is applied to a large scale database such as an Japanese electronic patent application specification database.

The first problem is a very long process time. As described in Chapter 2 of Prior Art 1, the full-text search achieves a search process speed of only about 2 MB/s even if a general large computer is used. Therefore, for example, if patent application specifications for several years having several GB to several tens GB are searched, a sufficient search response cannot be obtained.

The second problem of the full-text search is a number of search noises contained in the search results. If the full-text search is performed to search a patent specification regarding "検索システム" by using "検索" as a search term, for example a sentence "論理アドレスと物理アドレス間の変換" is also searched. Such a sentence is often contained in a patent specification regarding processors. Therefore, patent specifications other than the target patent specifications regarding processors are searched at the same time.

In order to solve the first problem, a high speed full-text search scheme called a hierarchical presearch scheme has been proposed as described in JP-A-3-174652 (hereinafter called Prior Art 2), and corresponding U.S. application Ser. No. 07/985795 filed on Jun. 14, 1990 which is a divisional application of U.S. Ser. No. 07/555,483. The disclosure of those applications is incorporated herein by reference. In order to solve the second problem, it has been proposed to search a target text by designating a logical structure as a search object. With this method, in searching a patent specification regarding "検索システム", the logical structure "Industrial Application Field" is designated as a search subject, and only specifications containing the character string "検索" in the logical structure are searched. As a result, such patent specifications regarding "processor" and containing the character string "検索" in the logical structure "Embodiments" can be omitted as being noise.

An example of this method has been proposed as described in "SGML and Full-Text Database" Information Science and Technology, Vol.43, No.12, 1993, pp.1097–1103 (hereinafter called Prior Art 3). With this method, a target document constituted by a plurality of logical structures (hereinafter called a structured document), such as a document described by a Standard Generalized Makeup Languages (SGML) is retrieved at high precision by performing a search of only a subject logical structure (hereinafter called structure designation search) as described in "Practical SGML", Eric van Herwijnen, Kluwer Academic Publishers, 1990.

The outlines of Prior Arts 2 and 3 will be described.

First the hierarchical pre-search scheme of Prior Art 2 will be described first.

With Prior Art 2, two surrogate files are automatically generated when texts are registered in a database.

One file stores a text condensed by deleting adjuncts providing no definite meaning by itself, by compressing repetitively occurring words into one word, and by other means.

The other file stores a character occurrence bitmap which is formed by representing each character of a text by bit information to compress the contents of the text.

In searching a text, these surrogate files are sequentially referred to to extract texts containing all characters of a designated search term, as search candidate texts, and other texts are eliminated from the search candidate texts. In addition, texts containing the designated search term as a word are extracted, and other texts are eliminated from the search candidate texts. In this manner, unnecessary texts are hierarchically discarded and an unnecessary source document search is dispensed with, so that a search speed is equivalently improved.

The registration operation of Prior Art 2 will be described with reference to FIG. 2.

When a document to be registered is inputted, text included in this document is stored as a "source text" in a search database.

Next, character strings of the source text are segmented into characters for each character class (kanji, hiragana, katakana, alphabet, and the like) while deleting character strings called adjuncts providing no definite meaning by themselves, such as "のための" and "による". Next, duplications of repetitively occurring words are rejected to form a "condensed text". Specifically, in the example of a text 1 shown in FIG. 2, "検索" is discarded as a duplicated word contained in "検索技術" so that "あいまい" and "検索技術" only are left in the condensed text.

A "character occurrence bitmap" is formed from the source text. Each character of the source text is represented by one bit. Specifically, "1" is set if a character is contained in the source text, and "0" is set if not, respectively at a corresponding character position of the character occurrence bitmap.

In the example of the text 1, "あ" and "い" are contained in the source text so that "1" is set, whereas "う" is not contained so that "0" is set. Furthermore, "検" and "素" are contained in the source text so that "1" is set.

In the above manner, when a text is registered, the condensed text and character occurrence bitmap are automatically generated for the preparation of hierarchical presearch.

The procedure of a search operation is shown in FIG. 3 which illustrates searching a text containing a character string "検索".

Upon searching the character occurrence bitmap, texts containing both "検" and "素" constituting the search term are extracted. Specifically, a logical product of a column "検" and a column "素" for each text is obtained from the character occurrence bitmap shown in FIG. 2, and a text having a logical product of "1" is extracted.

Next, condensed texts corresponding to the texts extracted as the results of searching the character occurrence bitmap are searched to extract those containing the search term as a word.

In the example shown in FIG. 2, texts 1, 2, and 4 are outputted as the results of searching the condensed texts because they contain "検索". A text 3 is not outputted because it contains a word "検索" although it contains characters "検" and "素".

With the hierarchical pre-search scheme of Prior Art 2, the search results can be achieved by only the condensed text search without searching source texts, if the search is performed without designating a positional relationship between search terms.

In the case of a search condition designating a positional relationship between search terms, source texts are searched. It is assumed that variable length don't care characters are represented by "*". For example, in searching a text containing a search term "data*compression", i.e., a character string of "data", several characters, and "compression", or in searching a text containing a search term "data [10C] compression", i.e., a character string of "data", ten characters, and "compression", source texts corresponding to extracted condensed texts are searched to compare the occurrence positions of two character strings and judge whether the proximity condition is met. Texts satisfying the search condition are then outputted.

The outline of the search process by the hierarchical pre-search has been described above.

As above, with Prior Art 2, texts irrelevant to an inputted search term are sequentially and hierarchically discarded in both character and word levels and are not used as search candidate texts. A full-text search speed is therefore equivalently improved.

Next, an example of a method of realizing a structure designation search of Prior Art 3 will be described.

This method aims at reducing search noise produced by a full-text search by using only a logical structure as a search object and discarding texts containing a search term in other logical structures.

First, a method of discriminating a logical structure will be briefly described, the logical structure being a collection of sentences providing a particular logic of the text.

In a structured document, specific character strings are written at the start and end of each logical structure in order to distinguish between logical structures of sentences of a text. The specific character strings will be called a forward marker and a backward marker hereinafter. For example, in an SGML text, the forward and backward markers are called a start tag and an end tag, respectively. The start tag is represented by ["<"+discriminator character string+ ">"], and the end tag is represented by ["</"+discriminator character string+">"]. This discriminator character string is called a logical structure discriminator hereinafter.

The logical structure discriminator is used for indicating what is written in each logical structure, and is generally represented by an abbreviated symbol representative of the title of the written contents of each logical structure. For example, the start tag for the logical structure "Abstract" in an Japanese electronic patent application specification text is represented by "<SDO ABJ>", and the end tag therefor is represented by "</SDO>", where SDO is an abbreviated symbol for a subdocument and ABJ stands for an abstract Japan.

Next, an example of the method of realizing a structure designation search of Prior Art 3 will be described with reference to FIG. 4.

In this example, it is assumed that a patent specification containing a character string "音声認識" in the logical structure "Abstract" is searched from. Japanese electronic patent application specification texts written in the SGML format.

As described previously, the start tag for the logical structure "Abstract" of an Japanese electronic patent application specification text is represented by "<SDO ABJ>", and the end tag therefor is represented by "</SDO>". The search condition in this case is equivalent to a search condition that a patent specification is to be searched which contains a character string "音声認識" in the area between a character string "<SDO ABJ>" and a character string "</SDO>".

Specifically, the search of the designated condition is executed by a process of searching a patent specification containing a search term "<SDO ABJ>*音声認識*</SDO>" from all Japanese electronic patent application specification texts.

In the above example, a text written by the SGML format is used. A text written by an Office Document Architecture (ODA) may also be used.

FIG. 5 shows a procedure of executing the structure designation search of Prior Art 3 by using the hierarchical pre-search scheme of Prior Art 2. In the example shown in FIG. 5, it is assumed that a patent specification is to be searched which contains a character string "音声認識" in the logical structure "Abstract".

First, in the character occurrence bitmap search, patent specifications having a value "1" of a logical product between the columns "音", "声", "認", and "識" are extracted, i.e., patent specifications containing all "音", "声", "認", and "識" constituting the search term "音声認識" are extracted.

Next, in the condensed text search, condensed texts corresponding to the patent specifications extracted as the result of the character occurrence bitmap search are subjected to a character string matching process by using a character string "音声認識" to extract patent specifications of condensed texts containing "音声認識" as a word.

Lastly, source patent specification texts corresponding to the condensed text extracted as the results of the condensed text search are searched, the source patent specification texts containing the forward marker "<SDO ABJ>" of the logical structure "Abstract", the search term "音声認識", and the backword maker "</SDO>" in this order. Namely, a character string matching process is performed by using a search term "<SDO ABJ>* 音声認識*</SDO> where * represents variable length don't care characters, to search patent specifications containing the character string "音声認識" in the logical structure "Abstract".

An estimated search time is calculated as in the following, for the case wherein Japanese electronic patent application specifications containing a character string "音声認識" in the "Abstract" are searched from Japanese electronic patent application specification texts of one hundred thousands (texts applied in about one hundred days, capacity: about 1,400 MB).

For example, as shown in FIG. 6, it is assumed that a character occurrence bitmap search reduction rate is 10%, a condensed text search reduction rate is 3%, a capacity of condensed texts for electronic patent application texts of one hundred thousands is about 300 MB, and a full-text matching search speed is 2 MB/s as indicated by Prior Art 1. The search time is calculated as in the following.

```
Search time = character occurrence bitmap search time
            + condensed text search time
            + source text search time
          = character occurrence bitmap search time
            + 300 MB × 0.1/2 MB/s
            + 1,4000 MB × 0.03/2MB/s
          ≈ 15 sec. + 21 sec.
          = 36 sec.
```

The character occurrence bitmap search is a process of calculating a logical product between four bits corresponding to "音", "声", "認", and "識" for each patent specification. A general computer (processor) can calculate a logical product between 32 bits to 64 bits, i.e., 32 to 64 texts, at the same time. As a result, the character occurrence bitmap search time is negligibly short as compared to the condensed text search time and source text search time.

As described above, with a conventional structured document retrieval system, a search process is performed with replacing a search condition by another search condition designating a positional relationship between words such as "<SDO ABJ>* 音声認識*</SDO>". It is therefore necessary to search original documents so that a search time is prolonged.

Furthermore, a condensed text is generated through information compression of an source patent specification text, without considering the logical structure such as "Abstract" and "Embodiments". Therefore, even if a logical structure such as "Abstract" is designated, the whole condensed text is required to be searched and an unnecessary condensed text search occurs, so that a search time is prolonged.

This problem also occurs when the hierarchical presearch is not utilized. That is, a search time is prolonged even when string comparing is executed using a structured document because it is required to perform string comparing with respect to the whole text including structured documents other than object ones.

To settle this problem, it is necessary to skip strings included in structured documents other than object ones in order to reduce the number of unnecessary string comparing.

SUMMARY OF THE INVENTION

It is an object of the present invention to provide a high speed structured document retrieval method and apparatus capable of obtaining a search results in a practically allowable search time even if a logical structure of a structured document database having a practical capacity is designated.

According to one aspect of the present invention, there is provided a structured document search method for searching a structured document constituted by a plurality of logical structures by using a logical structure, including the steps of: (a) registering the structured document in a search database in a registration process: (b) creating and registering a condensed text for each logical structure by discriminating each logical structure and segmenting the structured document into respective logical structures and by compressing the structured document for each logical structure in the unit of word; (c) creating and registering a character occurrence bitmap containing without duplication all characters contained in the structured document; (d) referring to the character occurrence bitmap in a search process and extracting a structured document containing all characters contained in a search term of a designated search condition equation; (e) extracting a condensed text for each logical structure corresponding to a logical structure designated as a search object and containing the search term, for structured documents extracted by the step (d); and (f) if the search condition equation designates a positional relationship between a plurality of search terms in the structured document, extracting a structured document containing the plurality of search terms and satisfying the positional relationship between search terms, for condensed texts for each logical structure extracted by the step (e).

The source text may be a source text for each logical structure, the character occurrence bitmap may be a character occurrence bitmap for each logical structure, the condensed text for each logical structure may be a condensed text for the whole source text, the condensed text for the whole source text or the condensed text for each logical structure may be omitted, the character occurrence bitmap for the whole source text or the character occurrence bitmap for each logical structure may be omitted, or a combination of these may be used, respectively for the search of a structured document.

With the above method, in searching a structured document constituted by a plurality of logical structures by designating a logical structure (in the structure designation search), a search of condensed texts of logical structures other than the designated logical structure can be omitted. In a simple search condition, a search of a source text can be omitted only by searching condensed texts of the designated logical structure. In this manner, even a large scale structured document can be subjected to a structure designation search in a practically allowable search time.

According to another aspect of the present invention in which strings included in logical structures other than object ones are skipped in order to avoide unnecessary matching, there is provided a structured document search method for searching a structured document containing a designated search term in a designated logical structure from a structured document group, each structured document being constituted by a plurality of logical structures, including the steps of: (a) detecting in a search process a forward marker representative of a start of each logical structure, for each of the plurality of logical structures; (b) calculating a length of the structured document for each logical structure from the forward marker to a backward marker representative of the end of the logical structure and corresponding to the forward marker; (c) creating a search database by adding the logical structure length after the forward marker; (d) detecting in a search process the forward marker from the structured document for each logical structure to be searched and judging whether the detected forward marker corresponds to the forward marker designated as a search object; (e) if the judgement results indicate that the detected forward marker corresponds to the forward marker designated as the search object, performing a character string matching process of the structured document of the subject logical structure by using the designated search term; and (f) if the judgement results indicate that the detected forward marker does not correspond to the forward marker designated as the search object, referring to the logical structure length and skipping the structured document of the subject logical structure to eliminate the structured document of the subject logical structure from an object of the character string matching process.

According to the present invention, only a structured document corresponding to a designated logical structure is subjected to a character string matching process so that a search time can be considerably shortened as compared to a conventional full-text search.

Specifically, in the structure designation search method of this invention, at the forward marker detection step and logical structure length calculation step, the forward marker of each logical structure of a registered structured document is detected and the logical structure length of each logical structure is calculated. At the search database creation step, a search database is created by adding a logical structure length of each logical structure after the forward marker. In the example shown in FIG. 26, the search database is created by adding the logical structure length of the "Title" after the forward marker "Title".

Next, in the search process, a structured document is read from the search database, and the character string matching process is performed for the read text. In this case, at the forward marker detection step, a forward marker is detected and it is checked whether the detected forward marker corresponds to a designated logical structure. If the judgement results indicate that the detected forward marker corresponds to the designated logical structure, the character string matching process is executed. Namely, the logical structure length after the forward marker is read and the succeeding text having the logical structure length is subjected to the character string matching process. If the judgement results indicate that the detected forward marker does not correspond to the designated logical structure, the matching process skip step is executed. Namely, the logical structure length after the forward marker is read and the succeeding text having the logical structure length is skipped to eliminate it from an object of the character string matching process.

In this manner, according to the structure designation search method of this invention, a structured document for each logical structure not designated as a search object is not subjected to the character string matching process. Accordingly, only the structured document of the designated logical structure is subjected to the matching process and a search time can be considerably shortened.

For example, it takes 700 seconds (1,400 MB/20 MB/sec) for a conventional method to perform a character string matching process of electronic patent application texts of one hundred thousands (applied about in 100 days, capacity: about 1,400 MB). In contrast, according to the present invention, only the texts for "Abstract" (about 50 MB) are required to be subjected to the character string matching process. Therefore, a search time can be shortened to 25 seconds (50 MB/2 MB/sec).

BRIEF DESCRIPTION OF THE DRAWINGS

FIG. 4 is a diagram illustrating a conventional structure designation search method.

FIG. 5 is a diagram showing a process flow of a conventional structure designation search.

FIG. 6 is a diagram illustrating a process flow of a conventional structure designation search.

FIG. 9 is a diagram showing an example of the logical structure of a technical report.

FIG. 11 shows an example of a correspondence table between logical structure discriminators and condensed text identification numbers.

FIG. 12 is a diagram showing an example of a registration process according to the first embodiment of the invention.

FIG. 14 is a diagram showing an example of a search process according to the first embodiment of the invention.

FIG. 15 shows an example of a correspondence table between logical structure discriminators and logical structure identification numbers for structured documents having a hierarchical structure.

FIG. 16 is a diagram showing an example of a search process according to a second embodiment of the invention.

FIG. 17 is a schematic diagram showing the structure of a structured document search system according to a third embodiment of the invention.

FIG. 18 is a diagram showing an example of a search process according to the third embodiment of the invention.

FIG. 20 is a diagram showing an example of a search process according to the fourth embodiment of the invention.

FIG. 21 is a diagram showing an example of a search process according to a fifth embodiment of the invention.

FIG. 23 is a diagram showing an example of a search process according to the sixth embodiment of the invention.

FIG. 24 is a schematic diagram showing the structure of a structured document search system according to a seventh embodiment of the invention.

FIG. 26 is a diagram showing an example of a search database according to the seventh embodiment of the invention.

FIG. 28 shows an example of a correspondence table between logical structure names and logical structure discriminators according to the seventh embodiment of the invention.

FIG. 32 is a diagram showing an example of the logical structure of a technical report according to a ninth embodiment of the invention.

FIG. 33 shows an example of a correspondence table between logical structure names and logical structure discriminators according to the ninth embodiment of the invention.

DETAILED DESCRIPTION OF THE PREFERRED EMBODIMENTS

First, the outline of the invention will be described.

A registration process will be described first.

Source documents are registered in a search database without changing the contents thereof.

Next, in a condensed text registration process for each logical structure, each logical structure of a registered source document is distinguished to segment each source document into logical structures, by detecting specific character strings of forward and backward markers of each logical structure.

An Japanese electronic patent application specification will be described by way of example with reference to FIG. 7. In the example shown in FIG. 7, the logical structure is an exceptional structure with duplicate definitions both by an SGML format and an ODA format.

Figure 7:
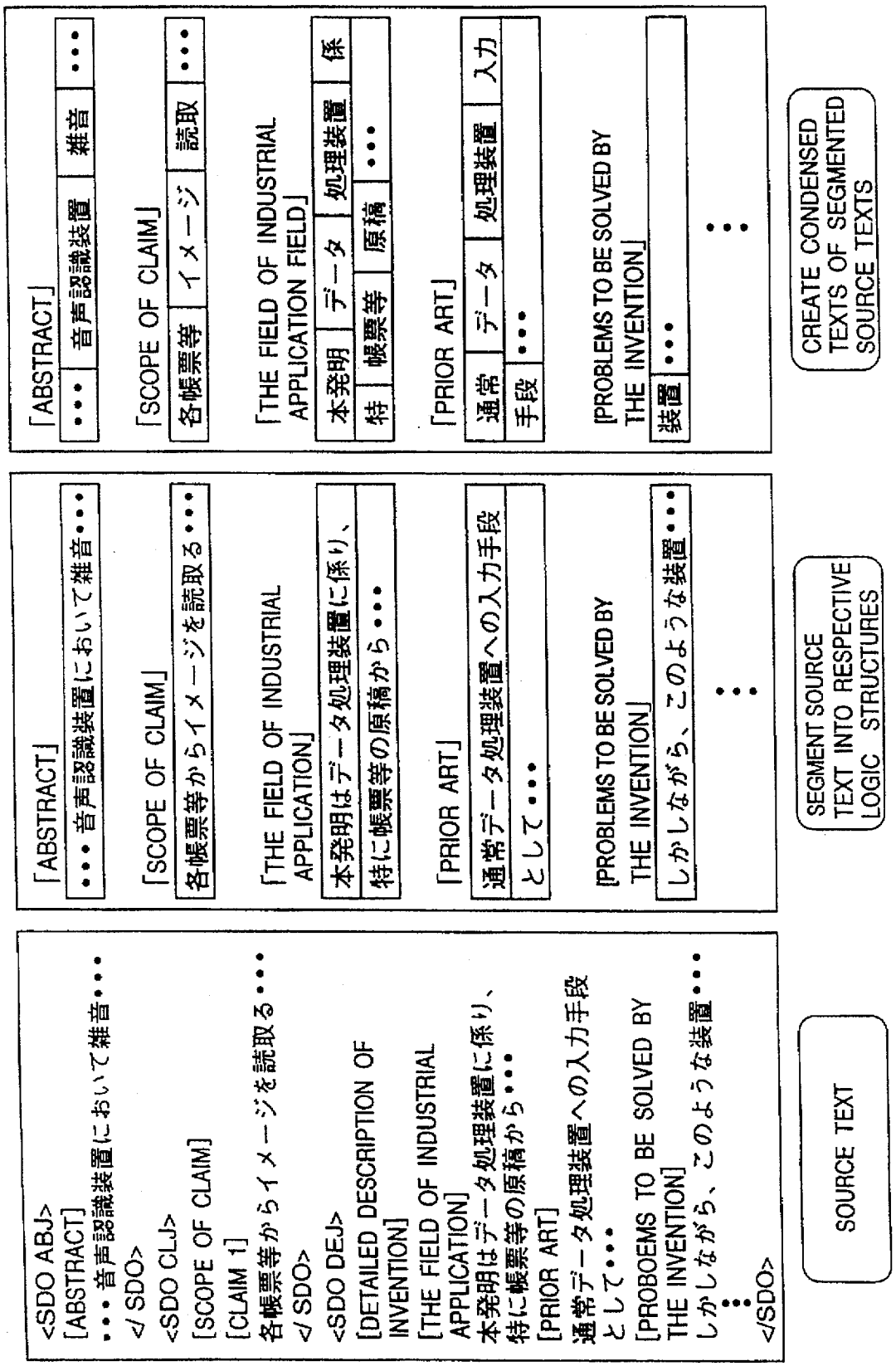
FIG. 7 is a diagram showing an example of a condensed text generating process according to the first embodiment of the invention.

As shown in FIG. 7, a text between the forward marker "<SDO ABJ>" of the "Abstract" and the backward marker "</SDO>" is cut as a text of the "Abstract".

In the case of the "Industrial Application Field" defined by the ODA format, a text between the forward marker "Industrial Application Field" of this logical structure and the backward marker "Prior Art" is cut as a text of the "Industrial Application Field". In this manner, the source document is segmented into source texts for respective logical structures. Since the title "Detailed Description of the Invention" has no succeeding sentence, a text is not cut.

The forward marker "Prior Art" of the logical structure next to that of the "Industrial Application Field" is used as the backward marker of the "Industrial Application Field". Condensed texts are then created from the segmented texts for respective logical structures.

Specifically, the segmented text of the "Abstract" is separated into partial character strings in which each unit represents a word. The inclusion relationship between separated partial character strings is checked to discard a word contained in another partial character string. In this manner, a condensed text of the "Abstract" is generated.

Similarly, the above operations are performed for the segmented texts of the "Scope of Claim for a Patent" and "Industrial Application Field" to generate condensed texts of respective logical structures which are registered in the search database as a condensed text file.

At a character occurrence bitmap creation and registration step, a character occurrence bitmap is created by setting a bit "1" for a character occurred in the source text, and registered in the search database as a character occurrence bitmap file.

Next, the outline of a search process will be described.

First, in the character occurrence bitmap search, a designated search term is segmented into each character, and a text containing all characters constituting the search term is extracted by referring to the character occurrence bitmap.

Next, in the condensed text search for each logical structure, of the condensed text files for respective logical structures created by the condensed text creation and registration process, the condensed text files for the logical structure designated as the search object are selected. Of the selected condensed text files, the condensed texts extracted by the character occurrence bitmap search are searched to extract texts containing the designated search term.

The search process is terminated if the designated search condition equation does not designate the positional relationship between a plurality of search terms in a source text.

If the designated search condition equation designates the positional relationship between a plurality of search terms in a source text, source texts are further searched.

In this source text search, the contents of each text extracted by the condensed text search are read, and only the texts containing the designated search terms and satisfying the designated search condition of the positional relationship between search terms, are searched.

Figure 8:
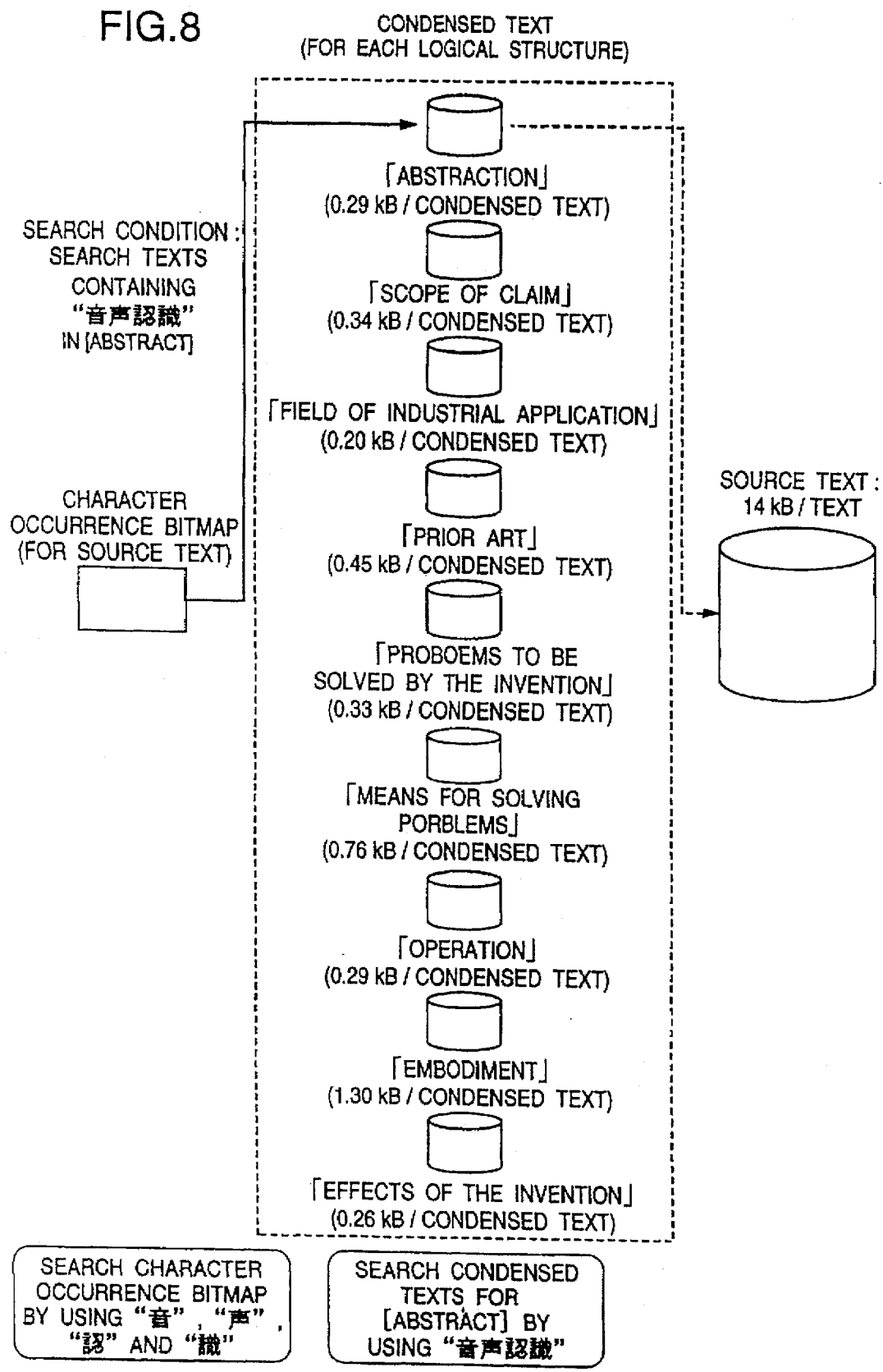
FIG. 8 is a diagram showing an example of a search process according to the first embodiment of the invention.

As above, in the structured document search of this invention, for example, in searching a text containing "音声認識" in the logical structure "Abstract", as shown by an arrow of a solid line in FIG. 8, of the texts extracted by the character occurrence bitmap search, corresponding condensed texts of the "Abstract" are selected from the condensed text files, and texts containing "音声認識" are searched.

The texts extracted by the condensed text search necessarily contain "音声認識" in the logical structure "Abstract". Therefore, without searching the source texts, the search process can be terminated.

Since an unnecessary source text search can be omitted, a search time when a logical structure is designated can be considerably shortened as compared to a conventional search method wherein a positional relationship between search terms is designated and source documents containing the forward marker "<SDO ABJ>" of the logical structure "Abstract", the search term "音声認識" and the backward marker "</SDO>" in this order area searched.

Furthermore, according to the present invention, condensed texts for the logical structure "Abstract" only are searched without searching all condensed texts. Therefore, unnecessary source documents containing the search term in other logical structures are not searched and the search time when a logical structure is designated can be shortened more as compared to a conventional search.

Still further, according to the present invention, even if a search condition equation designates a positional relationship between search terms, condensed text files only for the designated logical structure are searched without searching all condensed texts. Therefore, unnecessary source documents containing the search terms in other logical structures are not searched and the search when a logical structure is designated can be performed at high speed.

An estimated search time is calculated as in the following, for the case wherein the structured document search of this invention is performed for Japanese electronic patent application specification texts of one hundred thousands (texts applied in about one hundred days, capacity: about 1,400 MB) under the same conditions as the conventional method described previously.

For example, in the search process illustrated in FIG. 8, it is assumed that a character occurrence bitmap search reduction rate is 10%, a full-text matching search speed is 2 MB/s, an average capacity of each condensed text for the logical structure "Abstract" is 0.29 kB. The search time is given by:

---

Search time = character occurrence bitmap search time
 + condensed text search time
= character occurrence bitmap search time
 + 0.29 kB per one text × 100,000 texts
 × 0.1/2 MB/s
≈ 29 MB × 0.1/2MB/s = 1.5 sec.

---

A conventional search takes 38 seconds, whereas the structured document search of this invention takes about 1.5 seconds. The search time can be shortened about 20 times.

Next, embodiments of the invention will be described.

Figure 1:
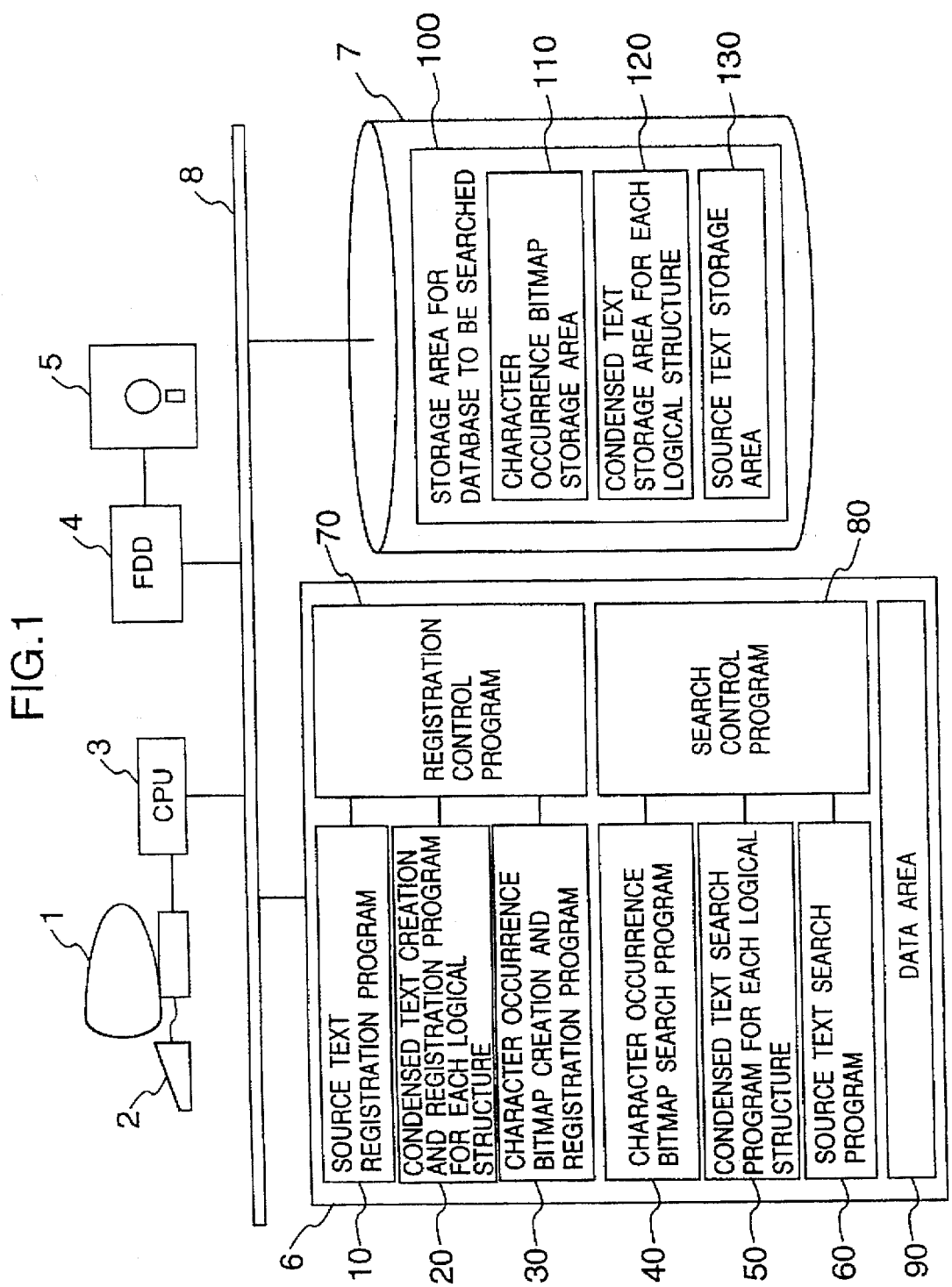
FIG. 1 is a schematic diagram showing the structure of a structured document search system according to a first embodiment of the invention.
Figure 2:
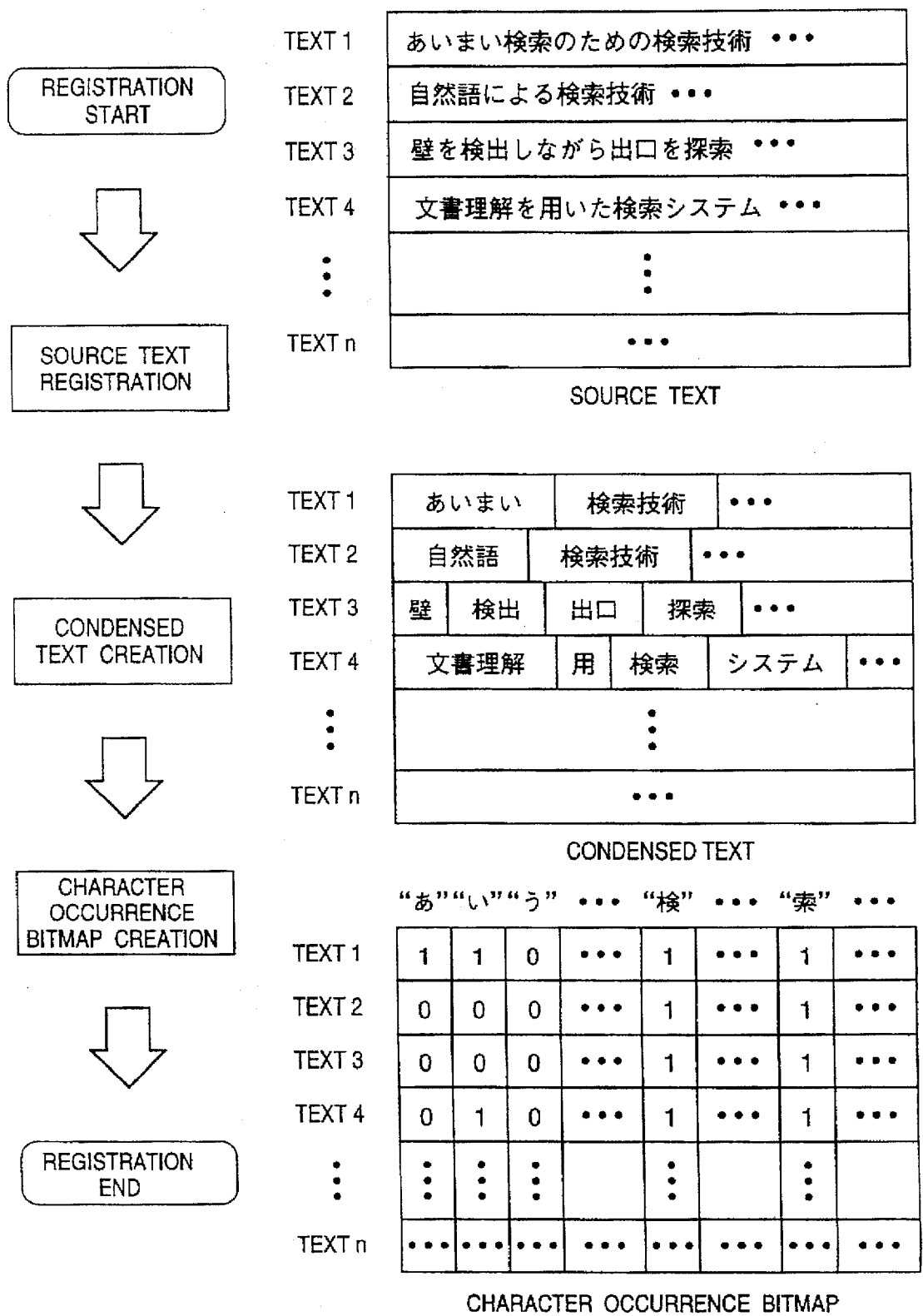
FIG. 2 is a diagram illustrating a conventional text registration method for a full-text search.
Figure 3:
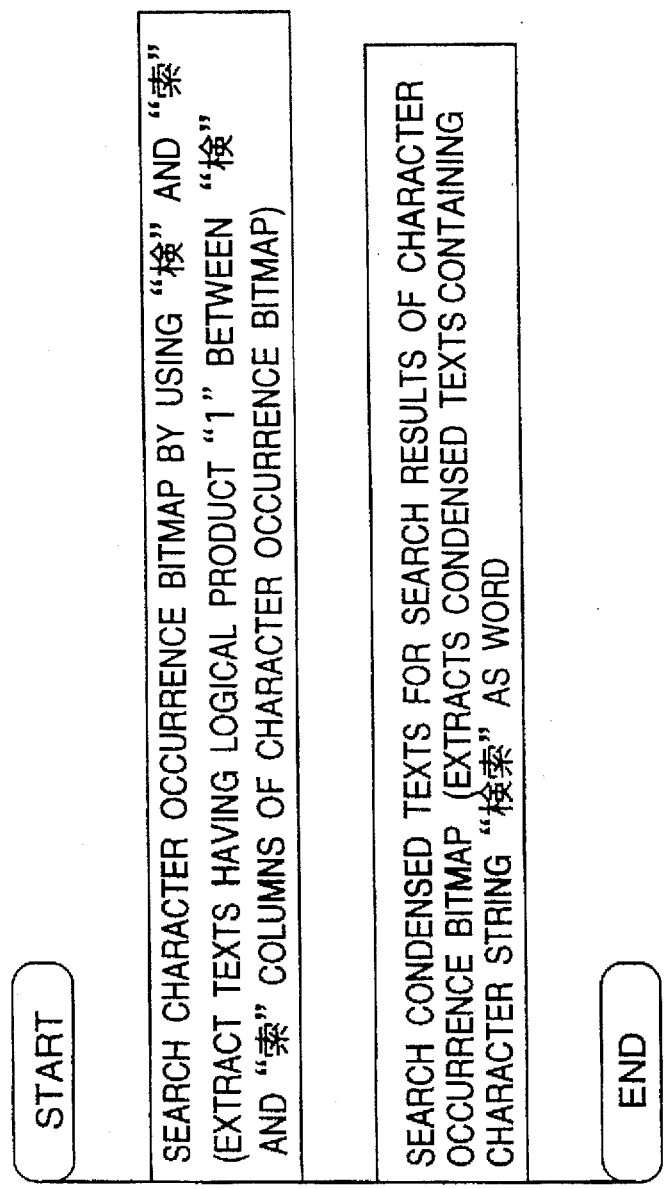
FIG. 3 is a diagram illustrating a conventional full-text search method.

A search system of a first embodiment using the structured document search of this invention is shown in FIG. 1.

The search system shown in FIG. 1 has a display 1 for displaying the search results, a keyboard 2 for entering registration and search commands, a central processing unit CPU 3 for executing registration and search processes, a floppy disk drive FDD 4 for reading data from a floppy disk, a floppy disk 5 for storing text data to be registered in a database, a main memory 6 for temporarily storing registration and search programs and data, a magnetic disk 7 for storing a search database, and a bus 8 for interconnecting these constituents.

The registration programs include a source text registration program 10 for storing a source text included in a source document, in a search database, a condensed text creation and registration program 20 for each logical structure for creating a condensed text from a source text and storing it in the search database, a character occurrence bitmap creation and registration program 30 for creating a character occurrence bitmap from a source text and storing it in the search database, and a registration control program 70 for controlling these programs.

The search programs include a character occurrence bitmap search program 40 for searching a character by referring to the character occurrence bitmap, a condensed text search program 50 for each logical structure for searching a word by referring to a condensed text, a source text search program 60 for checking a positional relationship by referring to a source text, and a search control program 80 for controlling these programs.

The main memory 6 has also a reserved data area 90.

The magnetic disk 7 has a search database storage area 100, a character occurrence bitmap storage area 110, a condensed text storage area 120 for each logical structure, and a source text storage area 130, respectively reserved therein.

In this embodiment, although the search database storage area 100 is reserved in the magnetic disk 7, it may be reserved in other secondary storages such as a optical magnetic disk.

Next, the logical structure of a structured document to be searched will be described with reference to FIG. 9. In this embodiment, a technicaL report to be searched is constituted by "Title", "Introduction", "Background", "Chapter Title", "Chapter Text", and "Conclusion". Each logical structure is divided by the start and end tags. In the example shown in FIG. 9, the logical structure "Title" is surrounded by the start tag "<Title>" and the end tag "</Title>".

The text registration process and search process of the structure designation search of this embodiment will be described.

First, the text registration process will be detailed with reference to FIG. 1 and the procedure illustrated in FIG. 10, by taking as an example registering a structured document shown in FIG. 9.

First, a registration command is entered from the keyboard 2 to activate the registration control program 70. A source document is read from the floppy disk 5 inserted into the floppy disk drive FDD 4, and stored in the data area 90.

Next, the registration program 70 activates the source text registration program 10 which in turn stores the source document itself stored in the data area 90, into the source text storage area 130 as a source text.

Thereafter, the registration program 70 activates the condensed text creation and registration program 20 for each logical structure which in turn detects a start tag representative of a start of a logical structure, from each registered source text.

The start tag is detected by judging whether a character after the start character "<" of the start or end tag is "/". Specifically, if "/" follows immediately after "<", it is judged to be the end tag, and if not, it is judged to be the start tag.

A character string after the start character "<" of the start tag and before the end character ">" is stored in the data area as a logical structure discriminator. Similarly, the end tag of the logical structure corresponding to the start tag is detected to thereby cut the source text into the text for the subject logical structure and store it in the data area 90.

Each divided source text for each logical structure is segmented into character classes including such as kanji, hiragana, katakana, and alphabet. Thereafter, adjuncts providing no definite meaning by themselves, such as "の" and "にょる" are deleted. In addition, a word repetitively occurring in an source text is discarded. In this way, a condensed text for each logical structure is created and registered in the condensed text storage area 120 for each logical structure.

In determining an identification number of a condensed text corresponding to the logical structure discriminator detected based upon the start tag, a correspondence table shown in FIG. 11 is used in this embodiment. When a search database is created, the registration control program 70 generates the correspondence table, referring a type definition sentence of a structured document, such as DTD (document type definition) of an SGML text. The correspondence table stores each logical structure name, a number specific to each logical structure (hereinafter called a logical structure identification number), and a logical structure discriminator. In the registration process, this correspondence table is referred to by using the logical structure discriminator as a search key, to obtain a condensed text file identification number and a condensed text file name, respectively corresponding to the logical structure discriminator.

Specifically, the logical structure discriminator obtained from a registered condensed text is compared with each logical structure discriminator in the correspondence table shown in FIG. 11. If the same discriminator is found, the corresponding condensed text identification number is obtained, and the condensed text is registered in the condensed text file having the corresponding file name.

The registration results of the structured document of FIG. 9 are shown in FIG. 12.

For the structured document shown in FIG. 9, the "<Title>" is judged to be the start tag because the character after "<" is not "/". "Title" is stored in the data area 90 as the logical structure discriminator, and the text after the start tag and before the end tag "</Title>" is stored in the data area 90 as the text for the logical structure "Title". Next, from the text "枠接触 文字の 認識精度向上 方式" for the "Title" stored in the data area, a condensed text is created.

Specifically, an adjunct "の" is deleted, and "枠接触 文字" and "認識精度向上 方式" are cut as the condensed text. Then, the correspondence table shown in FIG. 11 is referred to to search a character string "Title" from the column of the logical structure discriminator and obtain "1" as the condensed text identification number of the "Title". Then, "枠接触 文字" and "認識精度向上 方式" are registered in the condensed text storage area 120 for each logical structure at the condensed text file "file001" corresponding to the logical structure identification number "1".

The similar process is performed for the "Introduction". The similar process is performed thereafter until the registration for the whole source text is completed.

Figure 10:
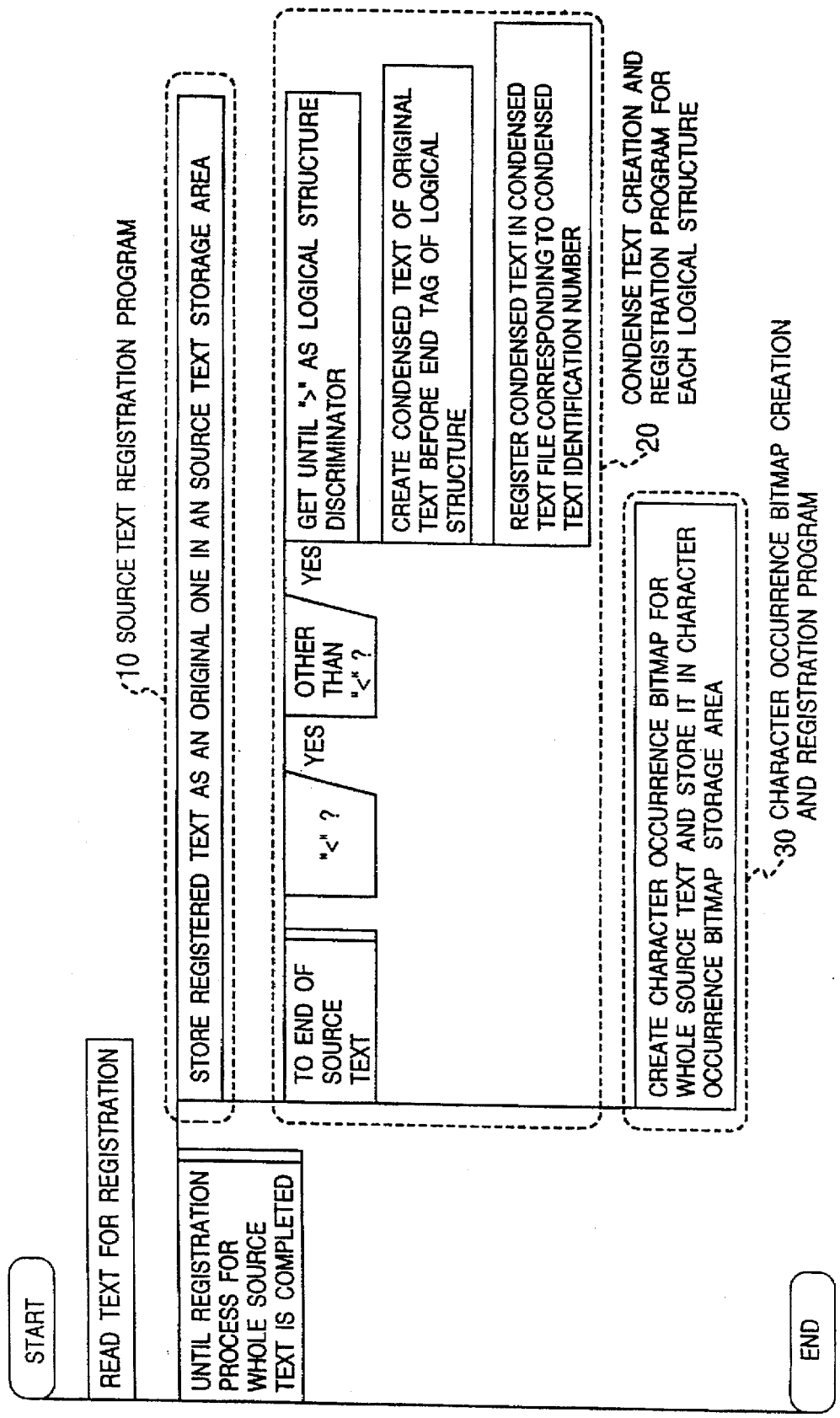
FIG. 10 is a diagram showing a registration process flow according to the first embodiment of the invention.

Next, as shown in FIG. 10, the registration control program 70 activates the character occurrence bitmap creation and registration program 30 which in turn creates a character occurrence bitmap for the source text and registers it in the character occurrence bitmap storage area 110.

Specifically, the character occurrence bitmap is set with all bits "0" at the initial condition. Bit "1" is then set for a character occurred in the source text. In the example shown in FIG. 12, all "文", "字", "認", and "識" occur in the source text so that bits "1" are set for these characters.

The above detailed description has been given for the registration process.

Figure 13:
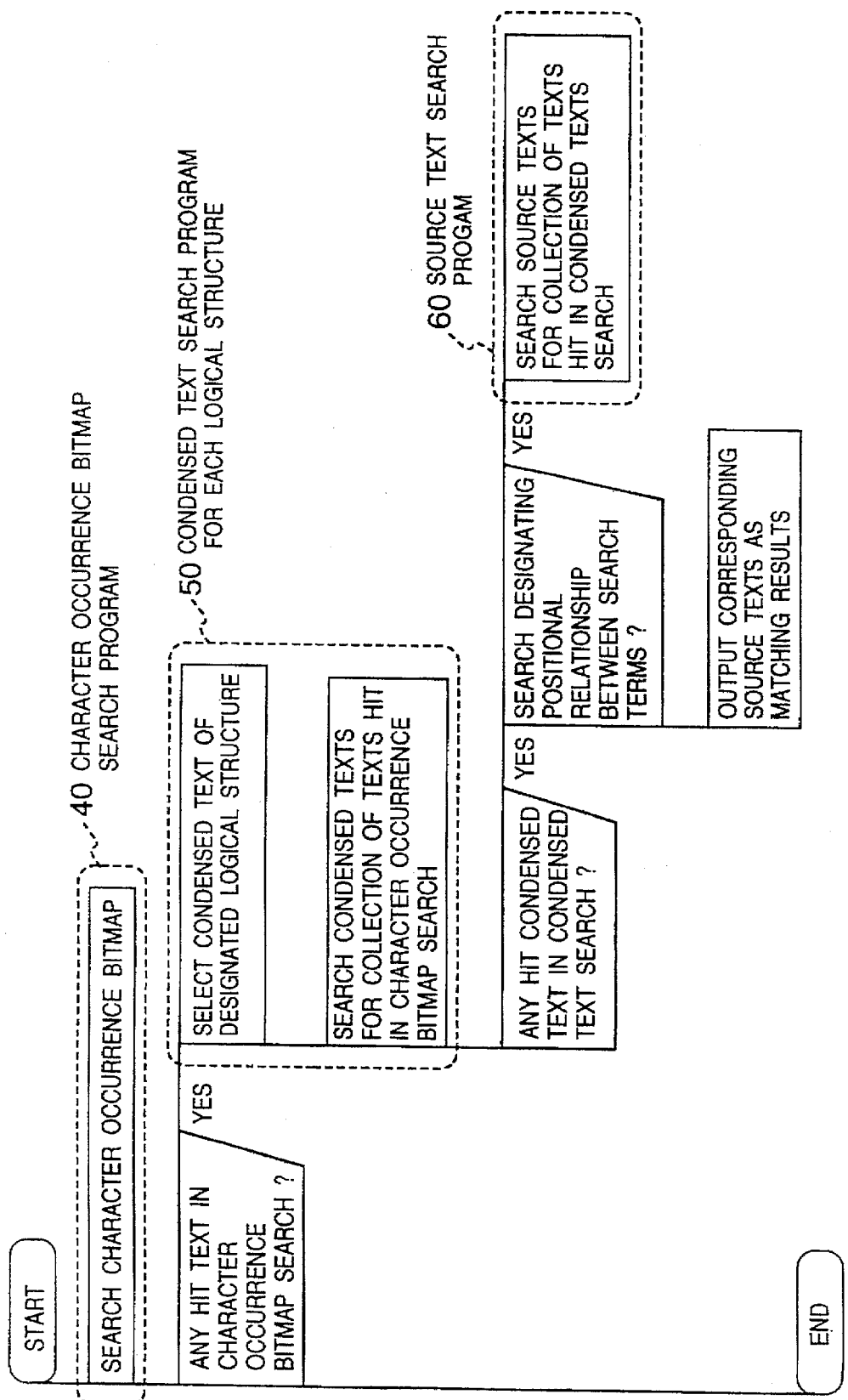
FIG. 13 is a diagram showing an example of a search process flow according to the first embodiment of the invention.

The search process is illustrated in FIG. 13. By using the structured document shown in FIG. 9, an operation of searching a text containing a character string "文字認識" in the "Conclusion" will be detailed with reference to FIG. 14.

First, prior to entering a search condition, a search preparation command is entered from the keyboard 2 to activate the search control program 80 which in turn reads the character occurrence bitmap, condensed texts for each logical structure, and source texts, respectively stored in the database storage area 100, and stores them in the data area 90 of the main memory 6.

Next, after a search condition is entered from the keyboard 2, the search control program 80 activates the character occurrence bitmap search program 40. This program 40 refers to the character occurrence bitmap stored in the data area 90, and performs a logical product operation of a bit train corresponding to all characters constituting a search term. Only those texts having the logical product of "1", i.e., containing all characters constituting the search term, are extracted.

Specifically, in the example shown in FIG. 14, the texts having the logical product "1" between bits of the character occurrence bitmap corresponding to the characters "文", "字", "認", and "識" constituting the search term, are extracted as the texts containing all the characters "文", "字", "認", and "識".

Thereafter, the search control program 80 activates the condensed text search program 50 for each logical structure.

With reference to the correspondence table of FIG. 11 storing logical structure discriminators and logical structure identification numbers, the condensed text search program 50 for each logical structure selects condensed texts of the designated logical structure, from all condensed texts for each logical structure.

Specifically, in the example shown in FIG. 14, with reference to the correspondence table of FIG. 11 storing logical structure discriminators and logical structure identification numbers, the designated logical structure name "Conclusion" is searched from the logical structure name column to obtain a file name "file006" of the condensed text file corresponding to the designated logical structure "Conclusion".

Of the condensed texts of the designated logical structure extracted by the character occurrence bitmap search program 40, condensed texts containing the search term in the designated logical structure are searched, and the text titles thereof are displayed on the display 1 as the search results.

Specifically, in this example, the matching process is performed by using the search term "文字認識" for the condensed text file "file006" corresponding to the designated logical structure "Conclusion" to thereby extract the text containing the character string "文字認識" in the logical structure "Conclusion".

Lastly, if the search condition designates a positional relationship between search terms, the search control program 80 activates the source text search program 60.

Specifically, assuming that variable length don't care characters are represented by "*", for example, in searching a text containing a search term "data*compression", i.e., a character string of "data", several characters, and "compression", or in searching a text containing a search term "data" [10C] compression, i.e., a character string of "data", ten characters, and "compression", the source search program 60 is executed for the collection of condensed texts searched by the condensed text search program 50 for each logical structure.

The source text search program 60 first checks at what character position of a source text each search term designated by the search condition equation matches. Next, the positional relationship between respective search terms matched in the source text search is compared. Then, source texts satisfying the designated positional relationship, i.e., having a difference of 10 characters or smaller between the character position of a source text matching the "data" and the character position matching the "compression", are extracted. In this manner, a search with a designated positional relationship between search terms can be realized.

The above description stands for the search process of this embodiment.

In this embodiment, a text described with the SGML format is used. A text described with the ODA format may also be used. The structure designation search of this invention is obviously applicable to any text whose start and end of each logical structure are discriminated by specific character strings.

In this embodiment, the source text registration program 10 registers a source document as a source text. A source document with their SGML tags being deleted may also be registered. In this case, although both the source document file of the SGML format for display and the source text file for search are required, necessary texts can be searched even if a search term such as "Title" and "Conclusion" is designated.

Also in this embodiment, a structured document without a hierarchical structure is used for the description of the registration and search processes. This invention is also applicable to a structured document with a hierarchical structure such as a text having a logical structure such as "Title", "Written date", and "Author name" under a logical structure of "Bibliography". In this case, the correspondence table shown in FIG. 11 storing logical structure discriminators and logical structure identification numbers is hierarchically written as shown in FIG. 15.

A second embodiment using the structure designation search method of this invention will be described with reference to FIG. 16.

In the first embodiment, condensed texts of a designated logical structure are searched after the search at a character level by using the character occurrence bitmap search. In the second embodiment, condensed texts are directly searched without the character level search.

In the second embodiment, for the registration process, the registration control program 70 activates the source registration program 10 and condensed text creation and registration program 20 for each logical structure, similar to the first embodiment. However, the character occurrence bitmap creation program 30 is not activated.

Namely, the source text registration program 10 shown in FIG. 1 stores the source document itself stored in the data area 90, in the source text storage area 130.

The condensed text creation and registration program 20 for each logical structure detects the start tag representative of the start of each logical structure of each source document and the end tag to thereby segment each source text into respective logical structures, and deletes adjuncts in each segmented text and discards words occurring repetitively in each source text to thereby create a condensed text for each logical structure.

Thereafter, the correspondence table shown in FIG. 11 is referred to to obtain the condensed text file name, and the condensed text is stored in the corresponding condensed text file.

In the search process, the search control program 80 activates not the character occurrence bitmap search program 40 of the first embodiment, but the condensed text search program 50 for each logical structure and the source text search program 60.

Specifically, as the first search stage of this embodiment, with reference to the correspondence table shown in FIG. 11, the logical structure file name corresponding to a designated logical structure is obtained to search the corresponding condensed text file and search a condensed text containing a designated search term in the designated logical structure.

In the example shown in FIG. 16, with reference to the correspondence table shown in FIG. 11 storing logical structure discriminators and logical structure identification numbers, the designated logical structure name "Conclusion" is searched from the logical structure name column to obtain the condensed text identification number "6" corresponding to the designated logical structure "Conclusion" and also obtain the condensed text file name "file006".

The matching process is performed by using the search term "文字認識" for the condensed text file "file006" to thereby search a text containing "文字認識" in the logical structure "Conclusion".

Lastly, if the search condition equation designates a positional relationship between search terms, the source texts of a collection of condensed texts extracted by the condensed text search for each logical structure, are searched.

In this embodiment, although a search time becomes longer than the first embodiment because condensed texts are not extracted by the character occurrence bitmap search, it is not necessary to create the character occurrence bitmap so that the capacity of the search database can be reduced.

Next, a third embodiment of this invention will be described which creates the character occurrence bitmap for each logical structure.

In contrast with the first embodiment which improves the text search reduction rate by searching the character occurrence bitmap created for the whole source text, in the third embodiment the character occurrence bitmap created for source texts and divided into respective logical structures is searched to further improve the text search reduction rate and shorten a time required for searching condensed texts.

The third embodiment of the invention is shown in FIG. 17.

In the structured document search system of this embodiment, the character occurrence bitmap creation and registration program 30, character occurrence bitmap search program 40, and character occurrence bitmap storage area 110 of the structured document search system of the first embodiment shown in FIG. 1 are replaced by a character occurrence bitmap creation and registration program 31 for each logical structure, a character occurrence bitmap search program 41 for each logical structure, and a character occurrence bitmap storage area 111 for each logical structure, respectively.

In this embodiment, in the registration process, similar to the first embodiment, the registration control program 70 activates the source text registration program 10 and condensed text creation and registration program 20. Next, the registration control program 70 activates the character occurrence bitmap creation and registration program 31 for each logical structure.

The character occurrence bitmap creation and registration program 31 for each logical structure creates the character occurrence bitmap for each logical structure, by using the source document divided into respective logical structures by the condensed text creation and registration program 20 for each logical structure.

Similar to the condensed text creation and registration program 20 for each logical structure, with reference to the correspondence table storing logical structure discriminators and character occurrence bitmap file names, the character occurrence bitmap for each logical structure is stored in the corresponding character occurrence bitmap file.

In the search process, the search control program 80 activates the character occurrence bitmap search program 41 for each logical structure.

Similar to the condensed text search program 50 for each logical structure, the character occurrence bitmap search program 41 for each logical structure refers to the correspondence table storing logical structure discriminators and character occurrence bitmap file names, selects the character occurrence bitmap file of the designated logical structure 4, and searches the corresponding character occurrence bitmap.

Specifically, in the example shown in FIG. 18, if a text containing "文字認識" in the "Conclusion" is designated to be searched, with reference to the character occurrence bitmap file for the "Conclusion", texts containing all the characters "文", "字", "認", and "識" are searched.

Similar to the first embodiment, for a collection of texts extracted by the character occurrence bitmap search, the condensed text search program 50 for each logical structure and source text search program 60 are executed.

In the third embodiment, since character occurrence bitmaps for respective logical structures are created, although the capacity of the search database increases more than the first embodiment, the text search reduction rate of the character occurrence bitmap search can be improved and the search time can be shortened because texts containing "文", "字", "認", and "識" in the logical structures other than the "Conclusion" can be discarded.

Figure 19:
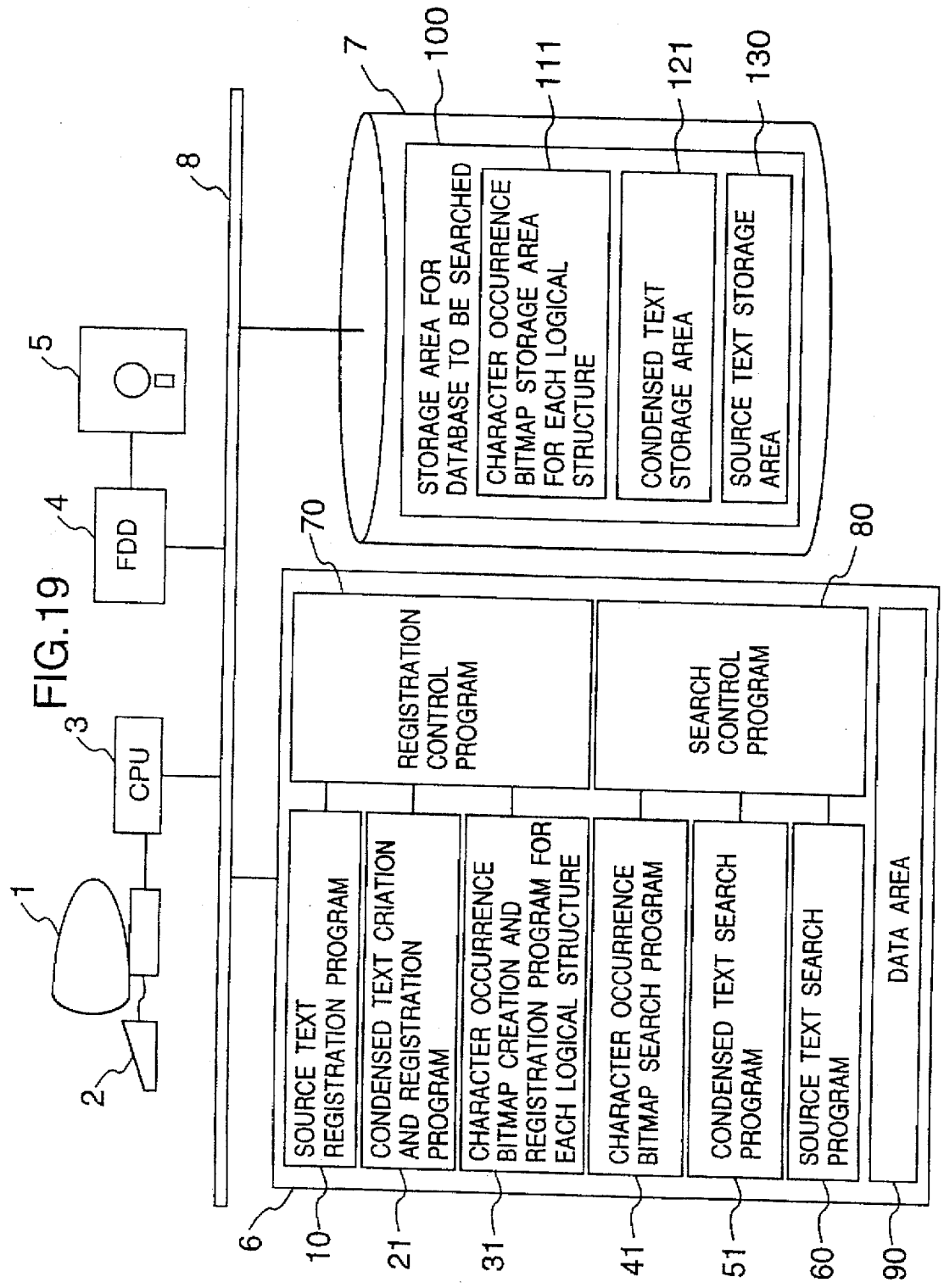
FIG. 19 is a schematic diagram showing the structure of a structured document search system according to a fourth embodiment of the invention.
Figure 22:
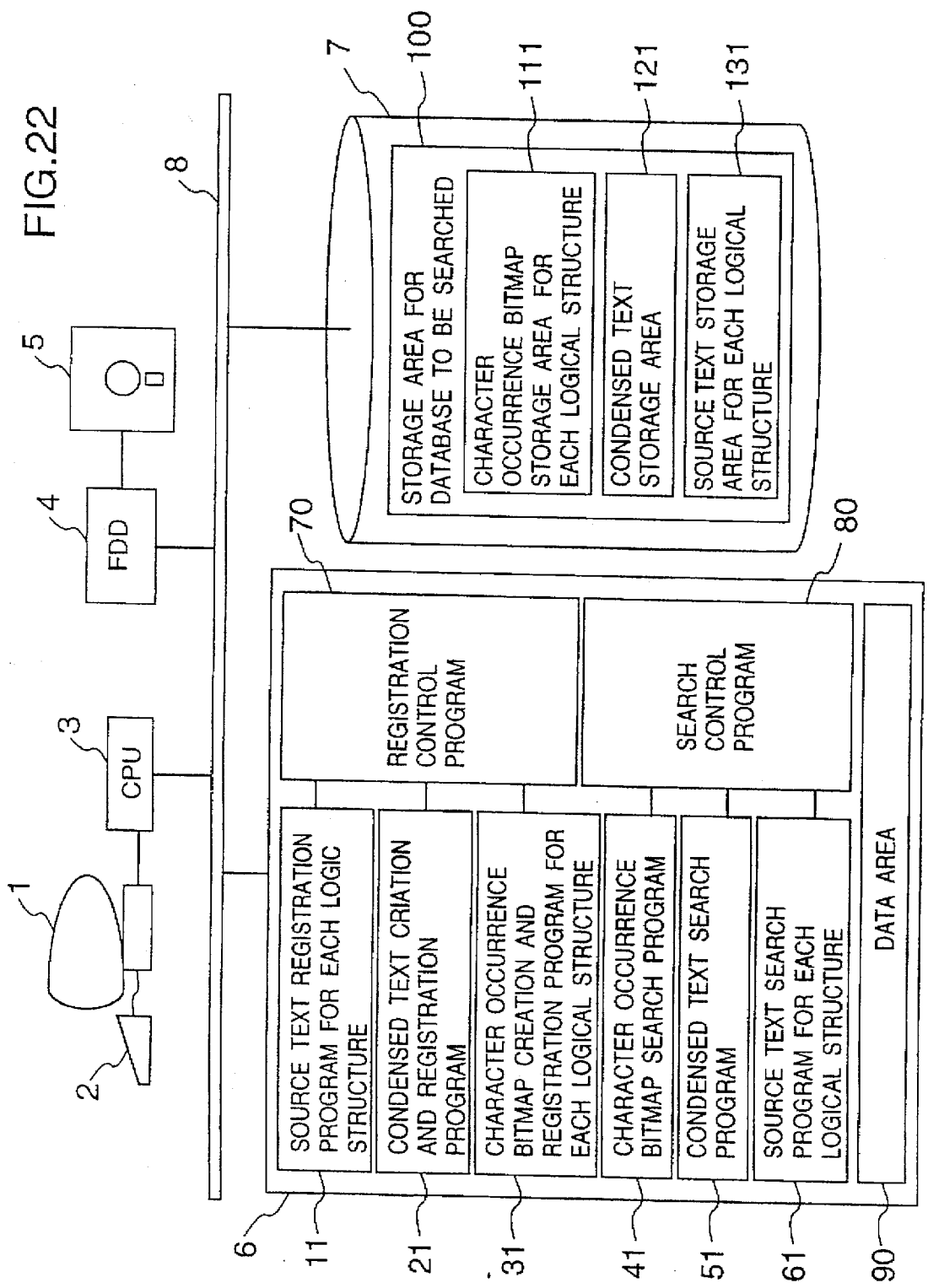
FIG. 22 is a schematic diagram showing the structure of a structured document search system according to a sixth embodiment of the invention.

A fourth embodiment of the invention is shown in FIG. 19.

In contrast with the third embodiment which creates condensed texts from source document divided into respective logical structures, in this embodiment a condensed text is created from the whole source document not divided into respective logical structures.

Specifically, the source text creation and registration program 21 for each logical structure creates a condensed text from the whole source document not divided into respective logical structures.

In the search process, the search control program 70 activates the character occurrence bitmap search program 41 for each logical structure. Specifically, in the example shown in FIG. 20, if a text containing "文字認識" in the "Conclusion" is designated to be searched, with reference to the character occurrence bitmap file for the "Conclusion", texts containing all the characters "文", "字", "認", and "識" are extracted.

For a collection of texts extracted by the character occurrence bitmap search program 41 for each logical structure, the matching operation is performed by using "文字認識" for the condensed text created from the whole source document not divided into logical structures.

Then, the source document corresponding to the condensed texts extracted by the condensed text search are searched to extract source document containing the designated search term in the designated logical structure, to thereby realize the structure designation search.

As compared to the structured document search method of the third embodiment, the structured document search method of the fourth embodiment searches a source document even if a positional relationship between search terms is not designated, so that a search time is prolonged. However, the capacity of a condensed text can be reduced because the whole source document is used for creating the condensed text and so the duplicated character strings can be reduced more. Accordingly, the total capacity of the search database can be reduced.

A fifth embodiment of the invention is shown in FIG. 21. In contrast with the third embodiment which searches the condensed texts created for each logical structure and extracted by searching the character occurrence bitmap for each logical structure, the fifth embodiment searches source document without searching condensed texts.

Specifically, in the example shown in FIG. 21, if a text containing "文字認識" in the "Conclusion" is designated to be searched, with reference to the character occurrence bitmap file for the "Conclusion", texts containing all the characters "文", "字", "認", and "識" are extracted. For a collection of texts extracted by the character occurrence bitmap search, source texts containing "文字認識" are searched and extracted.

The structured document search method of this embodiment searches source text without extracting condensed texts. Therefore, a search time is prolonged as compared to the structured document search method of the third embodiment. However, since condensed texts are not required to be created, the capacity of the search database can be reduced further.

In the first to fifth embodiments, the structure designation search is speeded up by searching source texts corresponding to the texts extracted at least by the character occurrence bitmap search or the condensed text search. Next, a six embodiment will be described wherein an source text is registered by dividing it into respective logical structures.

The structure of a structured document search system of this embodiment is shown in FIG. 6.

In this structured document search system, the source text registration program 10, source text search program 60, and source text storage area 130 of the structured document search system of the third embodiment shown in FIG. 17 are replaced by a source text registration program 11 for each logical structure, an source text search program 61 for each logical structure, and a source text storage area 131 for each logical structure, respectively.

In the third embodiment, the whole source text itself is registered. In this embodiment, each source text divided into respective logical structures is registered in the corresponding source text storage area 131 for each logical structure.

In the case of a search with a designated positional relationship between search terms, as shown in FIG. 23, for a collection of texts extracted by the character occurrence bitmap search for each logical structure and the condensed text search for each logical structure, source text files of the designated logical structure are searched.

Specifically, if a source text containing "精度" and "向上" in the "Conclusion" spaced by ten characters or smaller is to be designated to be searched, with reference to the character occurrence bitmap file of the "Conclusion", texts containing all the characters "精", "度", "向", and "上" are searched.

For a collection of the texts extracted by the character occurrence bitmap search, the matching operation is performed for the condensed text file of the "Conclusion" by using the character strings "精度" and "向上".

For a collection of the texts extracted by the condensed text files, source texts containing "精度" and "向上" spaced by ten characters or smaller are searched.

In the sixth embodiment, an source file is created for each logical structure. Therefore, only the source text of the designated logical structure is required to be searched so that a search time for a source text can be shortened as compared to the third embodiment.

In the sixth embodiment, both the character occurrence bitmap and condensed text are created for each logical structure. Instead, the character occurrence bitmap or condensed text may be created for the whole source text, or one or both of them may be omitted. In this case, it is obvious that a search time for a source text can be shortened.

A seventh embodiment of a structure designation search method of the invention will be described by using a technical report as a search object by way of example.

The structure of a search system realizing the structure designation search method of the invention will be described first with reference to FIG. 24. This search system is constituted by a display 1, a keyboard 2, a central processing unit CPU 3, a floppy disk drive 4, a floppy disk 5, a main memory 6, a magnetic disk 7, and a bus 8. The magnetic disk 7 has a reserved search database storage area 100. The main memory 6 stores a forward marker detection program 15, a logical structure length calculation program 25, a search database creation program 35, a forward marker determining program 45, a character string matching program 55, a matching process skip program 65, a registration control program 70, and a search control program 80, and has a reserved data area 90. In this embodiment:, although the search database storage area 100 is reserved on the magnetic disk 7, it may be reserved on other secondary storages such as an optical magnetic disk.

The above description is for the structure of this search system.

A text registration process and a text search process of the structure designation search method of this embodiment will be described with reference to FIGS. 25 and 27.

The text registration process will be detailed with reference to the problem analysis diagram of FIG. 25, by using a technical report such as shown in FIG. 9.

First, a command is entered from the keyboard 2 to activate the registration control program 70. A source document is read from the floppy disk 5 inserted into the floppy disk drive 4, and stored in the data area 90. At a forward marker detection step 15, a start tag representative of a start of a logical structure is detected, and a logical structure discriminator is stored in the data area 90. The start tag is detected by judging whether a character after the start character "<" of the start or end tag is "/" or not. Specifically, in the example shown in FIG. 9, the start tag "<Title>" of the logical structure "Title" is detected and the character string "Title" is stored as the logical structure discriminator.

Next, at a logical structure length calculation step 25, the length of the logical structure corresponding to the forward marker detected at the forward marker detection step 15 is calculated. If the character string of the "Title" is "枠接触 文字の 認識精 度向上 方式", the string has fourteen characters, i.e., 28 bytes (one Japanese character is represented by a two-byte character code). Therefore, the length of the logical structure "Title" is 28.

After the forward marker detection step 15 and logical structure length calculation step 25 are repeated to the end of the source document, at a search database creation step 35 the calculated length of each logical structure is added after the start tag of each logical structure, and a specific control code tot (top of text) representative of the top of the text, a text identification number (hereinafter called a text ID), and a specific code eot (end of text) representative of the end of the text, are written for the creation of a search database. The above operations are repeated until the whole source document is registered. Thereafter, a specific code eof (end of file) representative of the end of the search database file is written to create the search data base. In this example, the logical structure length of "28" is written as binary data after the start tag "<Title>" of the logical structure "Title", for the creation of the search database.

An example of the search database created by the above operations is shown in FIG. 26.

Figure 27:
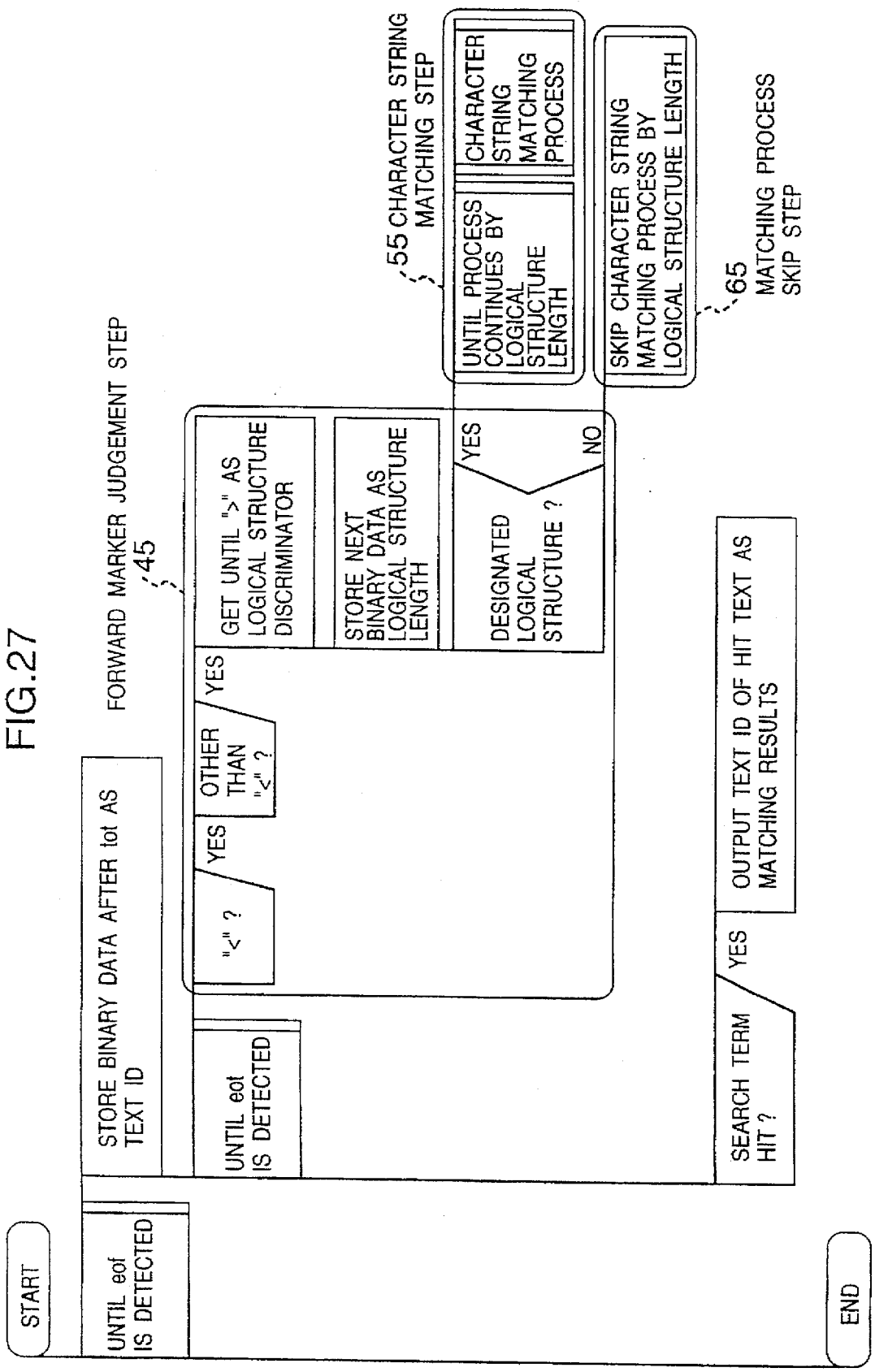
FIG. 27 is a diagram illustrating a search process flow according to the seventh embodiment of the invention.

The problem analysis diagram is shown in FIG. 27 which indicates a text search process of the structure designation method of the seventh embodiment. The detailed description will be given for the operation of searching a text containing a character string "work station" in the logical structure "Introduction" by using the search database shown in FIG. 26.

First, prior to entering a search condition, a command is entered from the keyboard 2 to activate the search control program 80 to thereby read the search database stored in the search database storage area 100 of the magnetic disk 7 and store it in the data area 90 of the main memory 6. When the search condition is entered, the code tot is detected from the search database stored in the data area 90, and the binary data after the code tot is stored as a text ID. In the example shown in FIG. 26, "1857" is stored as the text ID.

Next, a forward marker judgement step 45 is executed until the code eot 160 is detected. Specifically, the start tag of each logical structure is detected by judging whether a character after the start character "<" of the start or end tag is "/" or not, a character string between the start character "<" and the end character ">" representative of the end of the start tag is stored as a logical structure discriminator, and the binary data after the start tag is stored as the logical structure length in the data area 90. In the example shown in FIG. 26, a character string "Title" in the start tag "<Title>" is read and "28" is read as the logical structure length. It is then checked whether the read logical structure discriminator corresponds to the designated logical structure. In obtaining a logical structure discriminator corresponding to a designated logical structure, a correspondence table shown in FIG. 28 is used in this embodiment. The correspondence table is previously created by the registration control program 70 when the search database is created, in accordance with a type definition sentence of a structured document such as DTD (Document Type Definition) of an SGML text. The correspondence table stores a correspondence between logical structure names, numbers specific to respective logical structures (hereinafter called logical structure identification numbers), and logical structure discriminators. In the search process, a logical structure discriminator corresponding to a logical structure designated by an operator is obtained by referring to the correspondence table. Specifically, the same logical structure name as the designated logical structure name is searched in the correspondence table shown in FIG. 28, and a logical structure discriminator at the logical structure identification number corresponding to the same logical structure name is obtained. In determining a logical structure discriminator, an operator may directly enter the logical structure discriminator.

If the judgement results at the forward marker judgement step 45 coincide with the designated logical structure, a character string matching step 55 is executed for the text having the read logical structure length. If the judgement results do not coincide, a matching process skip step 65 is executed to skip the text having the read logical structure length to omit the character string matching process. In the example shown in FIG. 26, the logical structure discriminator of the designated logical structure is "Introduction" which is not the read logical structure discriminator "Title". Therefore, the text "枠接触 文字の 認識精 度向上 方式" having the logical structure length of 26 bytes is not read and is discarded. The following texts for "Written date" and "Author name" are also discarded in the similar manner. The logical structure discriminator "Introduction" next read is the logical structure discriminator of the designated logical structure. Therefore, the text having the logical structure length of 636 bytes for the logical structure "Introduction" is subjected to the matching process. Lastly, it is checked whether the search term is hit. If hit, the text ID of the hit text is outputted as the matching results, to the data area 90.

The above operations are repeated until the control code eof representing the end of the search database file is detected.

In the seventh embodiment of the invention, in the text registration process, a logical structure length is written after the forward marker of each logical structure for the creation of the search database, and in the text search process, the logical structure not designated for search is not read and is skipped by the amount of its logical structure length to discard it. In this manner, an unnecessary matching process is omitted and it becomes possible to realize a high speed structure designation search.

In this embodiment, prior to entering a search condition, the search database is read from the search database storage area 100 on the magnetic disk 7 and stored in the data area 90 of the main memory 6. Instead, each time a search condition is entered, the search database may be read from the magnetic disk 7 to the main memory 6.

In this embodiment, SGML tags are used for the forward and backward markers. Instead, a text using ODA (Office Document Architecture) tags may also be used. It is obvious that the structure designation search of this invention can be realized if a text is used whose logical structure is partitioned at its start and end by specific character strings.

Also in this embodiment, for a text or structure not added with a logical structure length of each logical structure, a logical structure length is calculated when a text is registered in the search database, by detecting the forward and backward markers representative of the start and end of each logical structure, and is added to the text or structure. However, a text already having a logical structure length, such as a text generated by a word processor or a text such as mails to be transmitted via a network, may also be used. Also in this case, the logical structure not designated for search is not read and is skipped by the amount of its logical structure length to discard it. In this manner, an unnecessary matching process is omitted and it becomes possible to realize a high speed structure designation search.

In the seventh embodiment, the start and end tags are used for the character strings which separate each logical structure of a text stored in the search database. If a character string contained in the logical structure discriminator included in the tag is designated as the search term, there arises a problem of searching an unnecessary text. Specifically, if a text containing "Written (作成)" in the technical report is searched from the search database shown in FIG. 26, the character string "Written (作成)" contained in the start and end tags "<Written date>(作成日)" and "</Written date>" is detected. To solve this problem, in an eighth embodiment to be described below, a tag in an SGML text is replaced by a specific control code for the creation of the search database.

A text registration process of the eighth embodiment will be described with reference to the problem analysis diagram of FIG. 29. Different points of this process flow shown in FIG. 29 from that of the seventh embodiment shown in FIG. 25 reside in that a step of searching a logical structure identification number is added after the forward marker detection step 15 and the contents of the search database creation step 35 are modified.

First, similar to the seventh embodiment, at the forward marker detection step 15, a start tag is detected from a registered text, by determining whether a character after the start character "<" of the start or end tag is "/" or not. A character string after the start character "<" and before the end character ">" is stored in the data area 90 as the logical structure discriminator. A logical structure identification number corresponding to the logical structure discriminator is obtained from the correspondence table shown in FIG. 28 storing logical structure discriminators and logical structure identification numbers. Specifically, in the example shown in FIG. 9, the start tag "<Title>" is detected from the logical structure discriminator "Title", and the logical structure identification number "1" is obtained by referring to the correspondence table 28.

At the logical structure length calculation step 25, the length of the logical structure is calculated.

At the search database creation step 35, in place of the start tag, a specific control code "α" representative of the start of the logical structure is written and the obtained logical structure identification number and logical structure length are written after the control code "α". The end tag is deleted, and the control codes such as text ID and eot are written for the creation of the search database. After the above operations are repeated until all texts are registered, the code eof representing the end of the search database file is written to create the search database.

Figure 30:
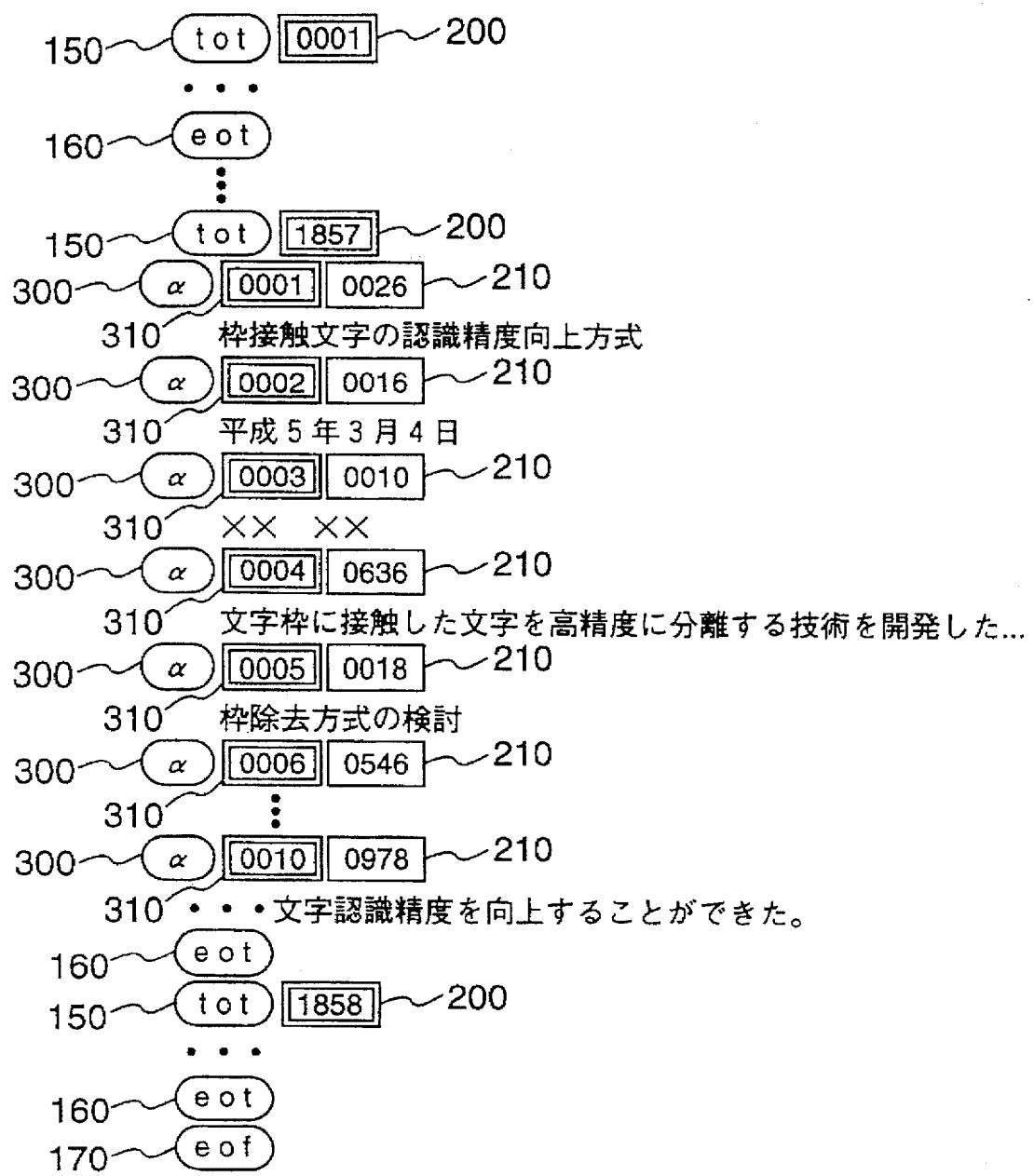
FIG. 30 shows an example of a search database according to the eighth embodiment of the invention.

An example of the search database created by the above operations is shown in FIG. 30. Different points of the search database shown in FIG. 30 from the search database of the seventh embodiment shown in FIG. 26 reside in that the start tag is replaced by the control code α 300 representing the start of the logical structure and the logical structure identification number 310, and the end tag is deleted.

Figure 31:
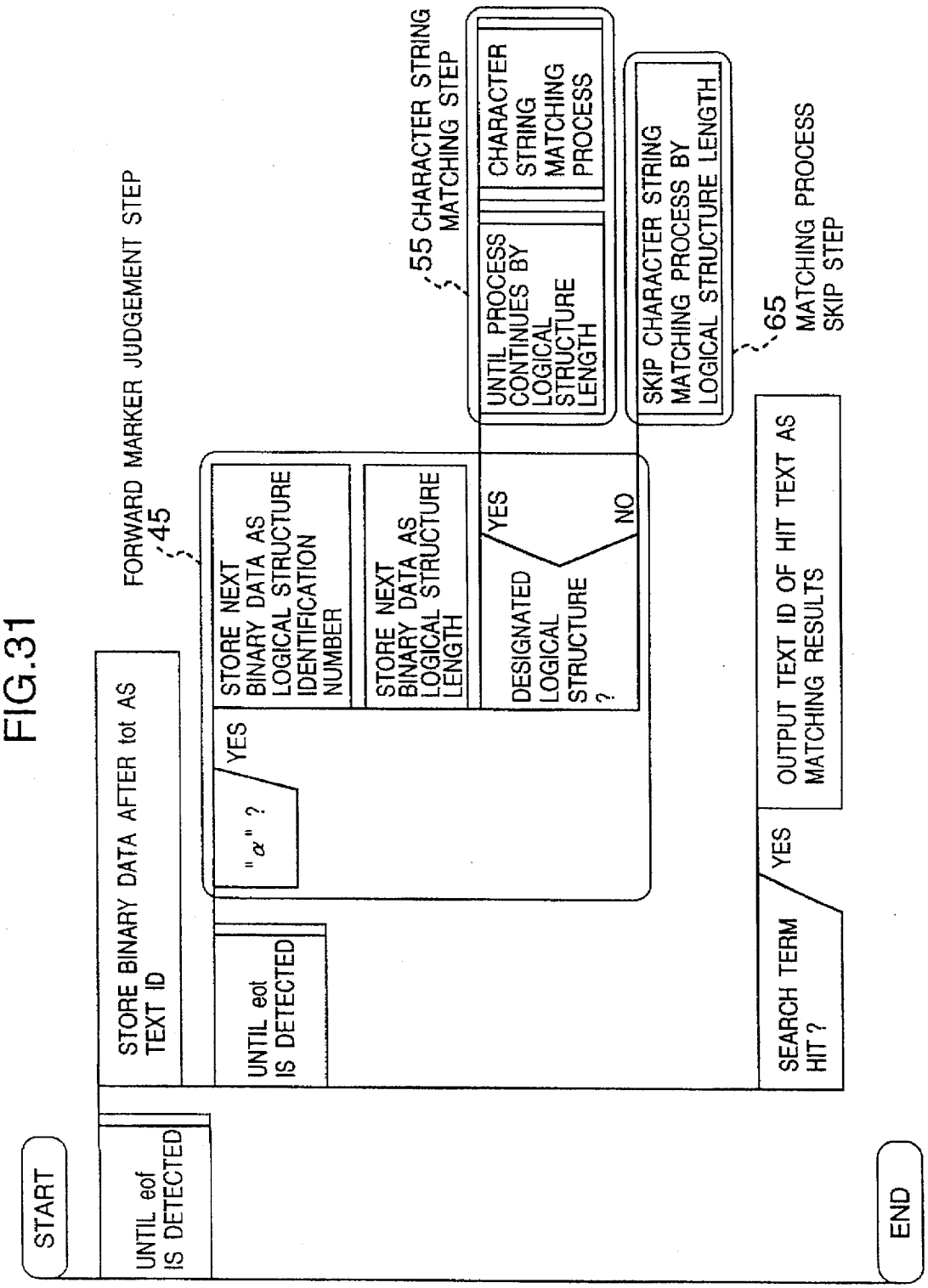
FIG. 31 is a diagram illustrating a search process flow according to the eighth embodiment of the invention.

The problem analysis diagram is shown in FIG. 31 which indicates a text search process of the eighth embodiment. The search process flow shown in FIG. 31 differs from the search process flow shown in FIG. 27 in that the contents of the forward marker judgement step 45 are modified. The detailed description will be given for the operation of searching a text containing a character string "work station" in the logical structure "Introduction" by using the search database shown in FIG. 30.

First, at the forward marker judgement step 45, the control code "α" is detected from the search database, and the following binary data is stored in the data area 90 as the logical structure identification number. The next following binary data is stored as the logical structure length. The logical structure identification number of the designated logical structure is compared with the logical structure identification number stored in the data area 90 to check whether the present logical structure corresponds to the designated logical structure. Similar to the seventh embodiment, if the judgement results at the forward marker judgement step 45 coincide with the designated logical structure, the character string matching step 55 is executed for the text having the read logical structure length. If the judgement results do not coincide, the matching process skip step 65 is executed. In the example shown in FIG. 30, the logical structure identification number after the control code—is "0001" which is not the read logical structure identification number "0004". Therefore, the text "枠接触文字の認識精度向上方式" having the logical structure length of 26 bytes is not read and is discarded. The following texts for the logical structure identification numbers "0002" and "0003" are also discarded in the similar manner. The logical structure identification number "0004" next read is the logical structure identification number of the designated logical structure. Therefore, the text having the logical structure length of 636 bytes is subjected to the matching process.

In contrast with the seventh embodiment which uses the start and end tag themselves as the character strings for separating a logical structure stored in the search database, the eighth embodiment replaces the tag by the specific control code for the creation of the search database. According to the eighth embodiment, similar to the seventh embodiment, the character string matching process is skipped for the logical structure not designated as a search object. Therefore, it is possible to realize a high speed structure designation search. In addition, an unnecessary text is not searched even if a character string contained in the logical structure discriminator included in the tag is designated as the search term, and it becomes possible to realize a high speed structure designation search.

A ninth embodiment will be described which can reduce the occurrence frequency of the forward marker judgement process for a structured document having a hierarchical structure and can provide a structure designation search faster than the seventh and eighth embodiments.

FIG. 32 shows an example of a structured document having a hierarchical structure. This technical report shown in FIG. 32 is constituted by a bibliography and a text. The bibliography includes a title, a written data, and an author name. The text includes an introduction, a plurality of chapter titles and chapter texts, and a conclusion. The technical report has the bibliography and text as the first hierarchical level, and as the second hierarchical level, it has the title, written data, and author name respectively for the bibliography, and the introduction, chapter title and conclusion respectively for the text. Consider now a search of a structured document having this hierarchical structure and having a character string having "work station" in the logical structure "Introduction". The logical structure "Instruction" is used as a search object so that the forward marker judgement process is not required for the bibliography. Nevertheless, the seventh to eighth embodiments execute in vain the forward marker judgement step for all logical structures in the bibliography. In contrast with this, the ninth embodiment shown in FIGS. 33 to 35 sets logical structure identification numbers at a plurality of levels to reduce an unnecessary process and further improve a search speed.

A correspondence table between logical structure names and logical structure identification numbers is shown in FIG. 33. The outline of the structure designation search method using this correspondence table will be briefly described. The correspondence table shown in FIG. 33 is different from the correspondence table shown in FIG. 28 in that the logical structure identification numbers are hierarchically defined.

Figure 29:
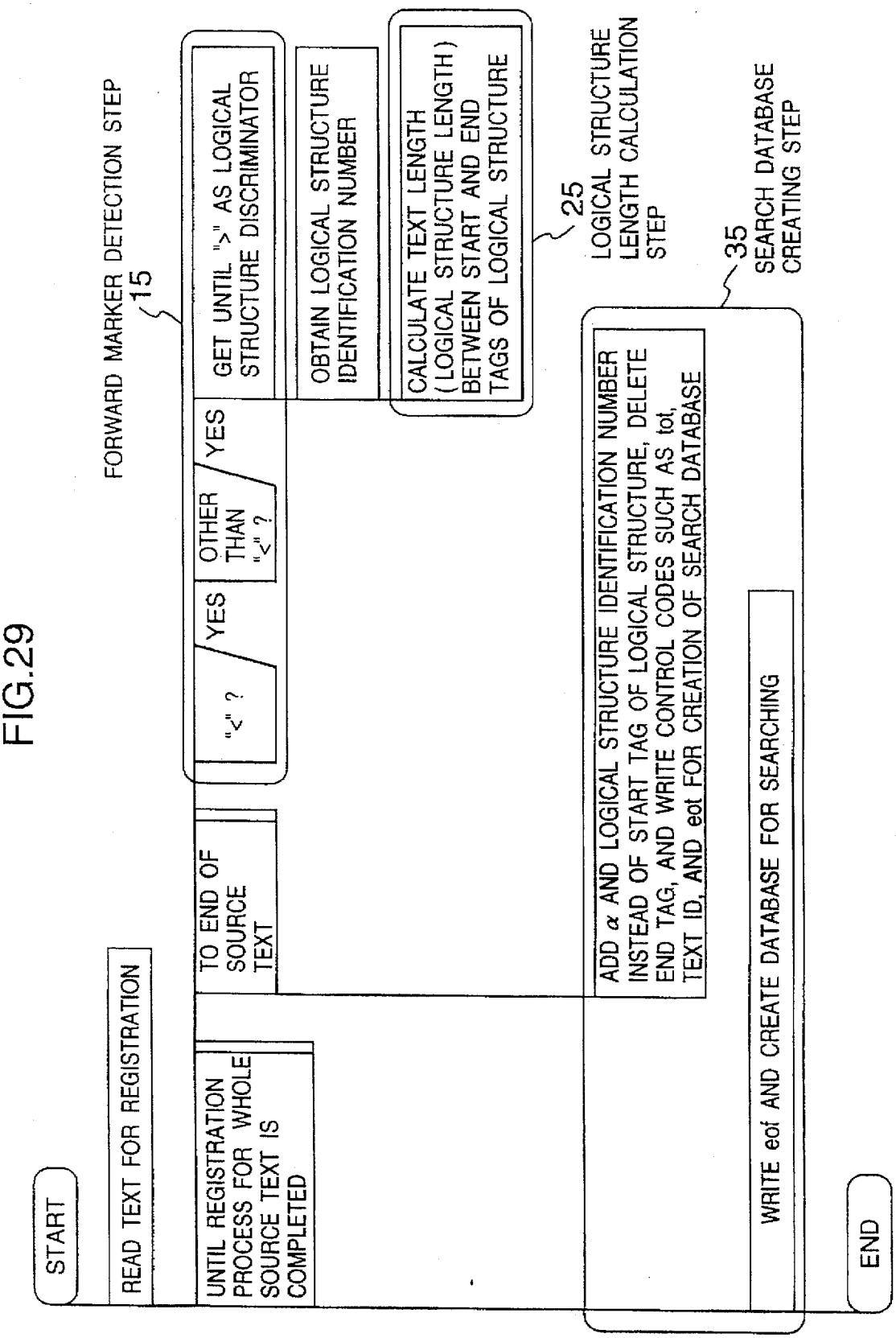
FIG. 29 is a diagram illustrating a registration process flow according to an eighth embodiment of the invention.

The registration process is performed in the same manner as the registration process of the eighth embodiment shown in FIG. 29. Specifically, similar to the seventh embodiment, at the forward marker detection step 15, a start tag is detected from a registered text, by judging whether a character after the start character "<" of the start or end tag is "/" or not. A character string after the start character "<" and before the end character ">" is stored in the data area 90 as the logical structure discriminator. A logical structure identification number corresponding to the logical structure discriminator is obtained from the correspondence table shown in FIG. 33 storing logical structure discriminators and logical structure identification numbers. Specifically, in the example shown in FIG. 32, the logical structure discriminator "Bibliography" is detected from the start tag "<Bibliography>", and with reference to the correspondence table shown in FIG. 33, a logical structure identification number "0001" for the level 1 and a logical structure identification number "0000" for the level 2 are obtained. At the logical structure length calculation step 25, the length of the logical structure is calculated. At the search database creation step 35, in place of the start tag for the logical structure, a specific control code "α" representative of the start of the logical structure is written and the obtained logical structure identification numbers and logical structure length are written after the control code "α". The end tag is deleted, and the control codes such as text ID and eot are written for the creation of the search database. After the above operations are repeated until all texts are registered, the code eof representing the end of the search database file is written to create the search database.

Figure 34:
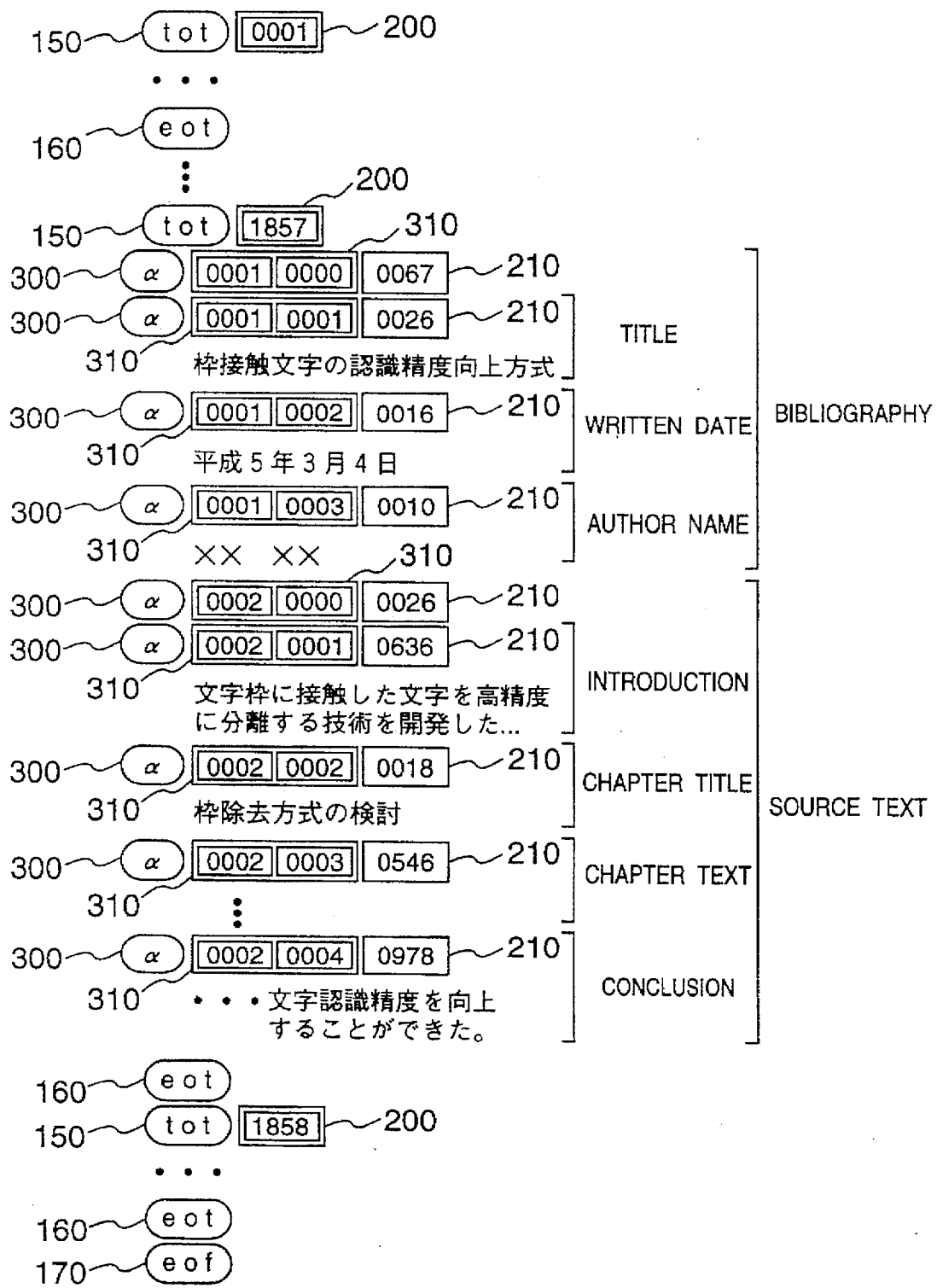
FIG. 34 shows an example of a search database according to the ninth embodiment of the invention.

An example of the search database created by the above operations is shown in FIG. 34. A different point of the search database shown in FIG. 34 from the search database of the eight embodiment shown in FIG. 30 resides in that logical structure identification numbers are classified into two levels.

Figure 35:
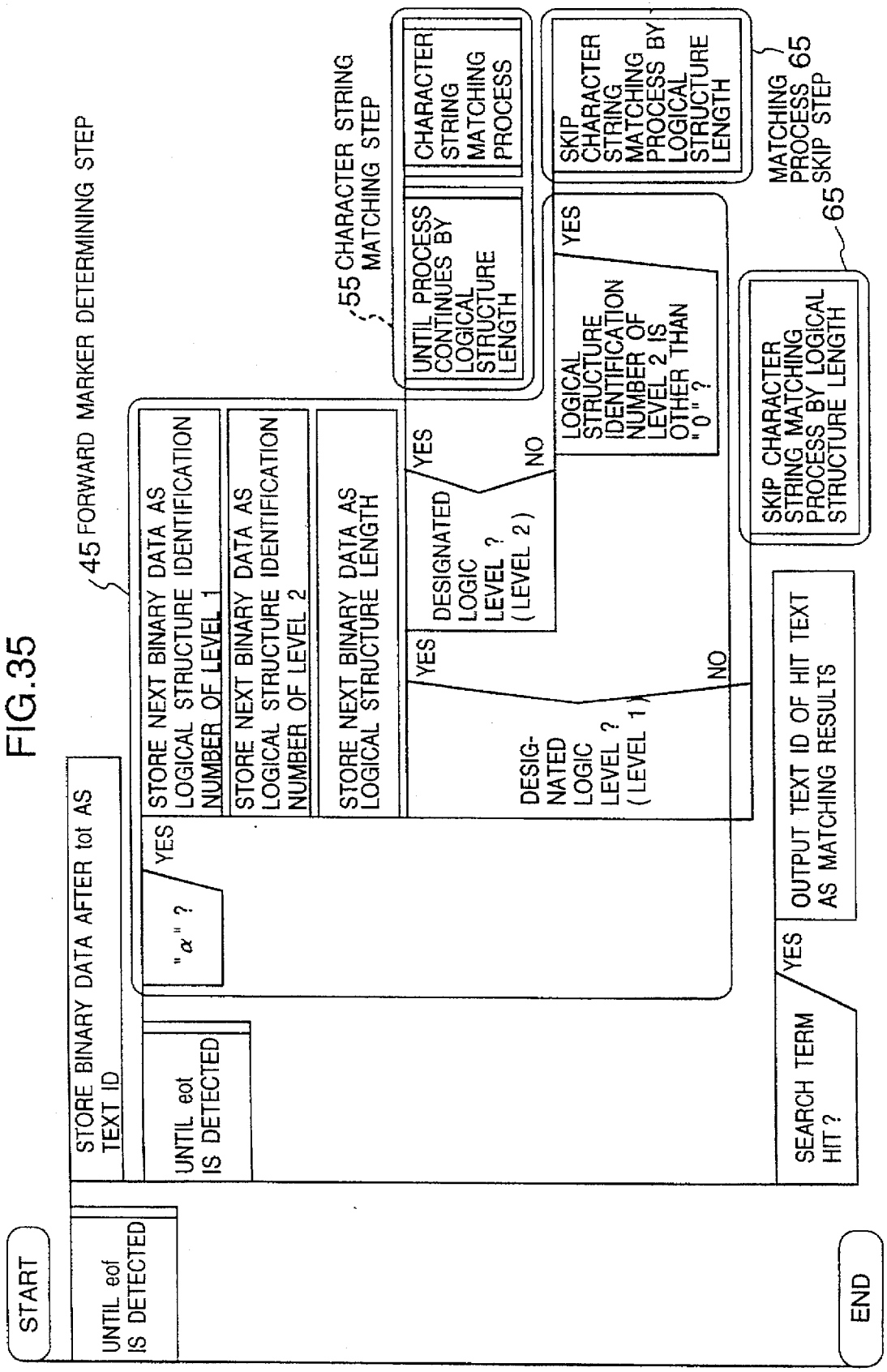
FIG. 35 is a diagram illustrating a search process flow according to the ninth embodiment of the invention.

The problem analysis diagram is shown in FIG. 35 which indicates a text search process of the ninth embodiment. The search process flow shown in FIG. 35 differs from the search process flow shown in FIG. 31 in that the contents of the forward marker judgement step 45 are modified.

First, at the forward marker judgement step 45, the control code "α" is detected from the search database stored in the data area 90, and the following two sets of binary data are stored in the data area 90 as the logical structure identification numbers of the levels 1 and 2. The logical structure identification numbers of the designated logical structure are compared with the logical structure identification numbers of the levels 1 and 2 stored in the data area 90 to check whether the present logical structure corresponds to the designated logical structure. The outline of this judgement process will be described below.

First, at the judgement of the level 1, it is checked whether the first hierarchical level logical structure corresponds to the designated logical structure. If the judgement results coincide with the designated logical structure, the judgement of the level 2 is next performed. If not, the text is skipped by the amount of its logical structure length and eliminated from the object of the matching process.

At the judgement of the level 2, it is checked whether the second hierarchical level logical structure corresponds to the designated logical structure. If the judgement results coincide with the designated logical structure, the text having the associated logical structure length is subjected to the character string matching process. If not, it is checked whether the logical structure identification number of the level 2 is "0", i.e., whether the corresponding logical structure discriminator is either the first or second hierarchical level. If not "0", i.e., if the logical structure discriminator is the second hierarchical level, the text having the associated logical structure length is skipped and eliminated from the object of the character string matching process. If "0", i.e., if the logical structure discriminator is the first hierarchical level, the forward marker judgement process continues for the further logical structure of the following first and second hierarchical levels.

Next, the description of a specific example will be given for the operation of searching a text containing a character string "work station" in the logical structure "Introduction" by using the search database shown in FIG. 34.

First, a logical structure identification number of the logical structure "Introduction" to be searched is obtained from the correspondence table of logical structure names and logical structure identification numbers shown in FIGS. 33. As the logical structure identification numbers of the levels 1 and 2, "2" and "1" are therefore obtained. Next, the control code "α" is detected from the data area, and it is checked whether the present logical structure is the designated logical structure. Specifically, in the example shown in FIG. 34, "1" for the level 1 and "0" for the level 2 after the control code "α" are detected as the logical structure identification numbers. It is then checked whether these logical structure identification numbers correspond to those of the designated logical structure. At the judgement of the level 1, it is judged that the present logical structure is not the designated logical structure. Therefore, the texts of the first hierarchical level logical structure, i.e., the texts in the logical structures of the bibliography are skipped and eliminated from the search object. Next, as the logical structure identification numbers of the levels 1 and 2, "2" and "0" are therefore obtained. The judgement of the level 1 indicates that the present logical structure is the designated logical structure. Therefore, the judgement of the level 2 is performed next. Although this judgment indicates that the present logical structure is not the designated logical structure, the logical structure identification number of the level 2 is "0" and therefore the present logical structure corresponds to the first hierarchical logical structure of the text. Therefore, the forward marker judgement process continues and the structure designation process for the logical structures of the second hierarchical level is executed. The logical structure identification numbers next detected are "2" for the level 1 and "1" for the level 2 which are the same as those of the designated logical structure. Therefore, the text having the associated logical structure length of 636 bytes is subjected to the character string matching process.

In the structure designation search method of the ninth embodiment of the invention, logical structure identification numbers are defined at a plurality of levels. Therefore, an unnecessary forward marker detection process can be omitted and the search time can be further shortened. In this embodiment, a two-level logical structure is used. It is obvious that the invention is applicable also to a structured document having logical structures of three levels or more.

In the structure designation search method of the seventh embodiment, prior to entering a search condition, the search database stored in the magnetic disk 7 is read and stored in the data area 90 of the memory 6. Instead, each time a search condition is entered, the search database may be read from the magnetic disk 7 and stored in the data area 90. However, with this method, a read time of the magnetic disk adversely affects the search time and prolongs it. Specifically, in the seventh embodiment, for the text stored in the data area 90 of the memory 6, the forward marker judgement step 45, character string matching step 50, and matching process skip step 65 are executed to reduce the capacity of texts to be subjected to the character string matching process, and to shorten the search time. It is necessary to read texts of all logical structures from the magnetic disk 7 when storing the search database in the data area 90 of the memory 6. Therefore, if the search database is read from the magnetic disk 7 and stored in the data area 90 each time a search condition is entered, a read speed of the magnetic disk becomes a bottleneck, considerably reducing the effects of shortening the search time.

In a tenth embodiment of the invention, the search database is constituted by a text file and an area information file. The text file stores only texts with the start and end tags being removed. The area information file stores the tags representative of each logical structure, and information of each logical structure such as a start address and a logical structure length.

Figure 25:
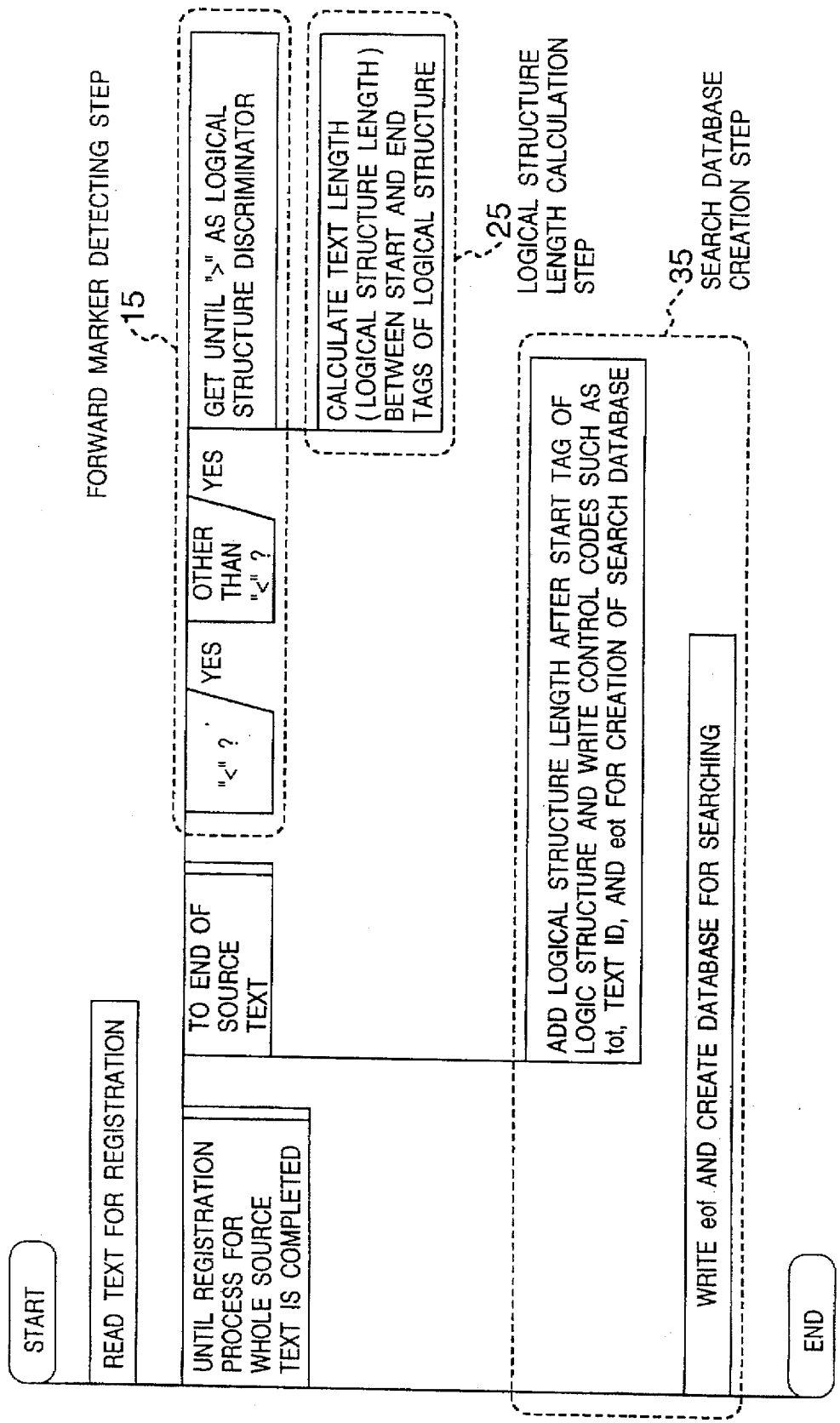
FIG. 25 is a diagram illustrating a registration process flow according to the seventh embodiment of the invention.

First, in the text registration process, at the search database creation step 35 in the text registration process flow of the seventh embodiment shown in FIG. 25, the area information file is created from a text to be registered, separately from the text file with the start and end tags being removed.

Figure 36:
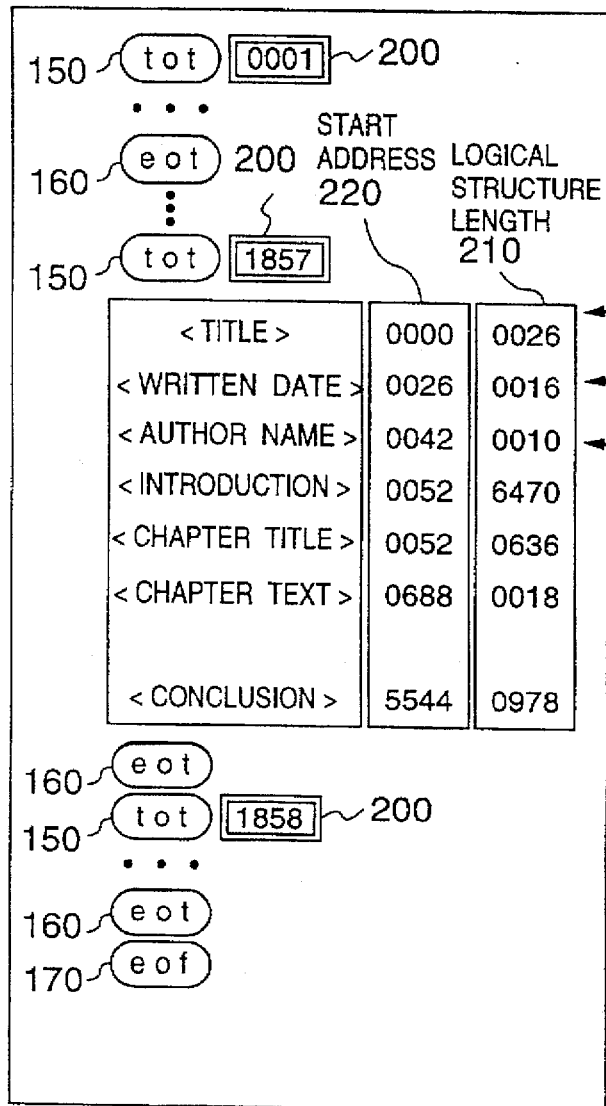
FIG. 36 shows an example of a search database according to a tenth embodiment of the invention.

Examples of the text file and area information file in place of the search database shown in FIG. 26 are shown in FIG. 36. The text file shown in FIG. 36 has a structure that start and end tags are deleted from the structured document. The area information file is created by extracting information other than texts of respective logical structures, from the search database shown in FIG. 26, and by adding a start address 220 of an area where each text is stored in the text file, after the start tag of the logical structure.

Figure 37:
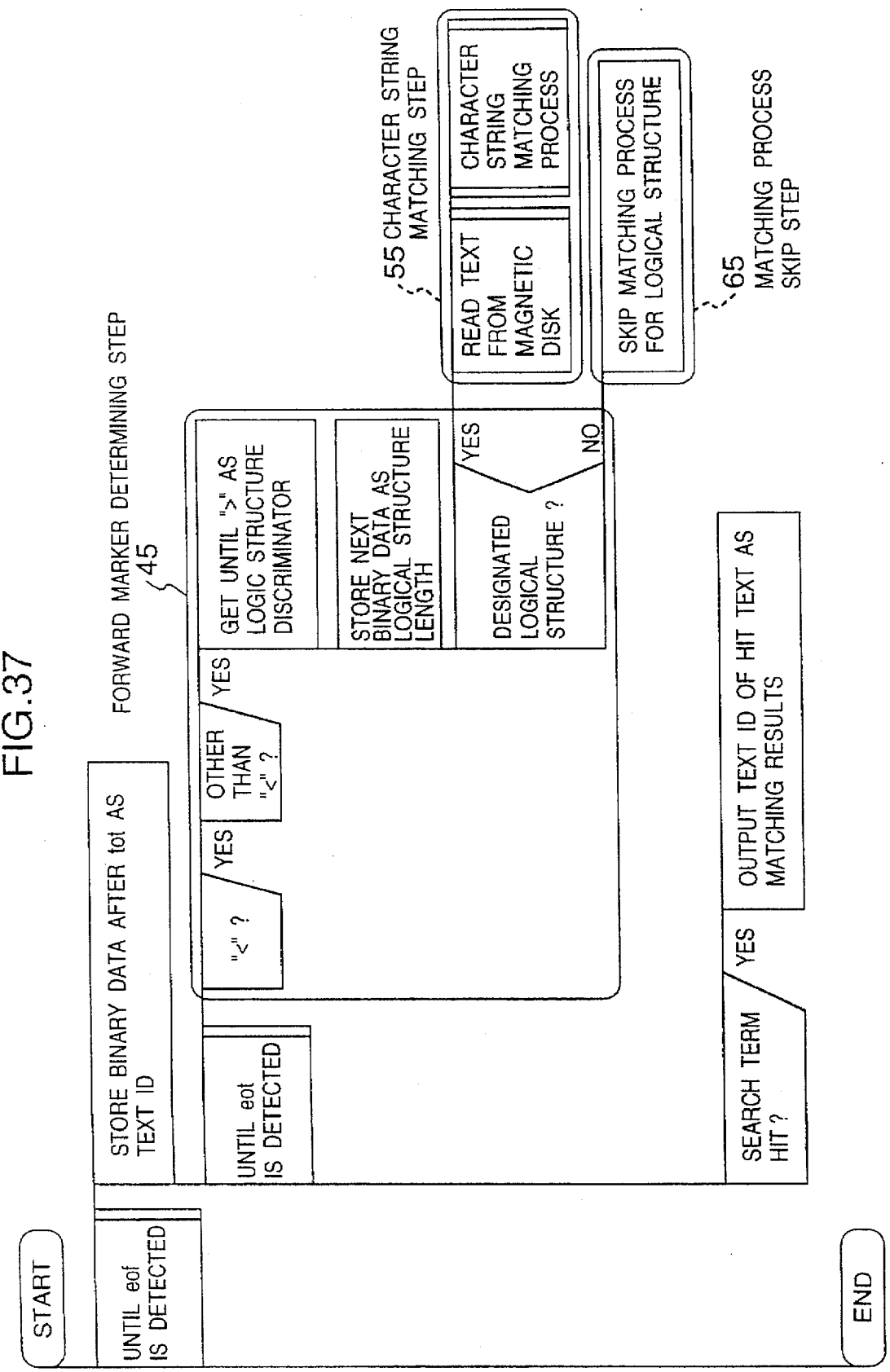
FIG. 37 is a diagram illustrating a search process flow according to the tenth embodiment of the invention.

The search process flow of the tenth embodiment is shown in FIG. 37. The search operation will be described with reference to FIG. 37. The search process flow shown in FIG. 37 is different from that of the seventh embodiment shown in FIG. 27 in that the contents of the character string matching step 55 are modified.

The outline of the search process flow shown in FIG. 37 will be described.

First, prior to entering a search condition, the area information file stored in the search database storage area 100 of the magnetic disk 7 is read and stored in the data area 90 of the main memory 6. The capacity of one area information file is about 100 bytes which is smaller than the capacity of several kBytes of one text file. Therefore, the memory capacity of the data area 90 for storing the area information file is smaller than for storing the whole text file.

Next, for the area information file shown in FIG. 36, the search process shown in FIG. 37 is executed. Specifically, similar to the search process flow of the seventh embodiment, the forward marker judgement step 45 is executed to detect the start tag from the area information file. It is then judged whether the start tag corresponds to the designated logical structure. If it is judged that the start tag corresponds to the designated logical structure, then the character string matching step 55 is executed. Two sets of binary data after the start tag are detected and stored as the start address of the logical structure stored in the text file and as the logical structure length, respectively. In accordance with the stored start address and logical structure length, the text corresponding to the designated logical structure is read from the text file stored in the magnetic disk 7 and stored in the data area 90 of the memory 6 to execute the character string matching step 65. If it is determined that the start tag does not correspond to the designated logical structure, the matching process skip step 65 is executed. Namely, the text of this logical structure is not read from the magnetic disk and eliminated from the search object.

Next, a description will be given for a specific example of searching a text containing a character string "work station" in the "Introduction" from the search database shown in FIG. 36.

First, the start tag "Title" is detected from the area information file shown in FIG. 37, and the corresponding logical structure discriminator "Title" is obtained. This logical structure discriminator is different from the logical structure discriminator "Introduction" of the designated logical structure "Introduction", so that the matching process skip step is executed without reading the text of this logical structure from the text file. Namely, the text of this logical structure is not read from the text file and is eliminated from the search object. Next, the logical structure discriminators for the "Written date" and "Author" are detected. These logical structure discriminators are different from the logical structure discriminator "Introduction" of the designated logical structure "Introduction", so that the matching process skip step is executed without reading the texts of these logical structures from the text file. Next, the logical structure discriminator "Introduction" of the logical structure "Introduction" is detected which is the same as the logical structure discriminator of the designated logical structure. Therefore, the character string matching step is executed. Specifically, the two sets of binary data after the start tag of the logical structure "Introduction" are stored as the start address and logical structure length. In accordance with the start address and logical structure length, the text stored in the magnetic disk is read and stored in the data area of the memory to thereafter execute the character string matching process.

In the structure designation search method of the tenth embodiment, the search database is constituted by the text file for storing texts of respective logical structures and the area information file for storing the area information of the text file indicating at what area the text of each logical structure is stored. In the search operation, the structure designation search is executed by using the area information file, and only the text of the designated logical structure is read from the text file and stored in the memory. Therefore, the amount of data read from the magnetic disk is reduced and the search time is shortened.

In the above embodiment, prior to entering a search condition, the area information file is read from the magnetic disk 7 and stored in the data area 90 of the memory 6. As described previously, the capacity of one area information file is about 100 bytes which is smaller than the capacity of several kBytes of one text file. Therefore, a high speed structure designation search can be realized even if the area information file is read from the magnetic disk 7 and stored in the memory each time a search condition is entered.

In the above embodiment, for a structured document for which the area information file is not formed which file stores such as tags representative of the start and end of each logical structure and the start address and logical structure length of each logical structure, the forward and backward markers representative of the start and end of each logical structure are detected during the registration operation to thereby create the text file storing only texts with the start and end tags being removed and the area information file indicating an area of a text of each logical structure in the text file. The embodiment is also applicable to a text already having an area information file in addition to a text file, such as a text generated by a word processor or a text such as mails to be transmitted via a network. Also in this case, the structure designation search is performed by using the area information file, and only the text of a designated logical structure is read from the text file stored in the magnetic disk and stored in the memory. In this manner, the capacity of data read from the magnetic disk can be reduced and the search time can be shortened.

What is claimed is:

1. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) storing the structured document in a database;

b) creating, and storing in the database, condensed texts and the corresponding unique discriminators for each of the respective logical structures, each of the condensed texts being formed by segmenting the structured document according to the predetermined markers and including all words within the respective logical structure without duplication; and c) creating, and storing in the database, a character occurrence bitmap including all characters without duplication in the structured document;

inputting a search term and a discriminator identifying a logical structure;

searching the character occurrence bitmap for each of the structured documents and identifying a plurality of first document identifiers corresponding to the character occurrence bitmaps indicated as including each character contained in the inputted search term; and searching the condensed texts corresponding to the input discriminator and identified by the first document identifiers and identifying a plurality of second document identifiers corresponding to the condensed texts which include each word contained in the inputted search term;

wherein if the search term includes a plurality of words and indicates a positional relationship between the words, the method further comprises the step of:

searching the structured documents identified by the second document identifiers and identifying a plurality of third document identifiers corresponding to the structured documents containing all the words having the positional relationship defined in the inputted search term.

2. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) storing the structured document in a database; and b) creating, and storing in the database, condensed texts and the corresponding unique discriminators for each of the respective logical structures, each of the condensed texts being formed by segmenting the structured document according to the predetermined markers and including all words within the respective logical structure without duplication;

inputting a search term and a discriminator; and searching the condensed texts corresponding to the input discriminator and identifying a plurality of first document identifiers corresponding to the condensed texts which include each word contained in the inputted search term;

wherein if the search term includes a plurality of words and indicates a positional relationship between the words, the method further comprises the step of:

searching the structured documents identified by the first document identifiers and identifying a plurality of second document identifiers corresponding to the structured documents containing all the words having the positional relationship defined in the inputted search term.

3. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each of the structured documents including:

a) storing the structured document in a database;

b) creating, and storing in the database, condensed texts and the corresponding unique discriminators for each of the respective logical structures, each of the condensed texts being formed by segmenting the structured document according to the predetermined markers and including all words within the respective logical structure without duplication; and c) creating, and storing in the database, character occurrence bitmaps and the corresponding unique discriminators for each of the respective logical structures, each of the character occurrence bitmaps being formed by segmenting the structured document according to the predetermined markers and including all characters within the respective logical structure without duplication;

inputting a search term and a discriminator;

searching the character occurrence bitmaps corresponding to the input discriminator and identifying a plurality of first document identifiers corresponding to the character occurrence bitmaps indicated as including each character contained in the search term; and searching the condensed texts corresponding to the input discriminator and the documents identified by the first document identifiers and further identifying a plurality of second document identifiers identifying the condensed texts which include each word contained in the inputted search term;

wherein if the search term includes a plurality of words and indicates a positional relationship between the words, the method further comprises the step of:

searching the structured documents identified by the second document identifiers and identifying a plurality of third document identifiers corresponding to the structured documents containing all the words having the positional relationship defined in the inputted search term.

4. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) storing the structured document in a database;

b) creating, and storing in the database, a condensed text for the structured document, the condensed text including all words within the structured document without duplication; and c) creating, and storing in the database, character occurrence bitmaps and the corresponding unique discriminators for each of the respective logical structures, each of the character occurrence bitmaps being formed by segmenting the structured document according to the predetermined markers and including all characters within the respective logical structure without duplication;

inputting a search term and a discriminator;

searching the character occurrence bitmaps corresponding to the input discriminator and identifying a plurality of first document identifiers corresponding to the character occurrence bitmaps indicated as including each character contained in the inputted search term; and searching the condensed text for each of the structured documents identified by the first document identifiers and identifying a plurality of second document identifiers corresponding to the condensed texts indicated as including each word contained in the inputted search term;

wherein if the search term includes a plurality of words and indicates a positional relationship between the words, the method further comprises the step of:

searching the structured documents identified by the second document identifiers and identifying a plurality of third documents containing all the words having the positional relationship defined in the inputted search term.

5. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) storing the structured document in a database; and b) creating, and storing in the database, character occurrence bitmaps and the corresponding unique discriminators for each of the respective logical structures, each of the character occurrence bitmaps being formed by segmenting the structured document according to the predetermined markers and including all characters within the respective logical structure without duplication;

inputting a search term and a discriminator; and searching the character occurrence bitmaps corresponding to the input discriminator and identifying a plurality of first document identifiers corresponding to the character occurrence bitmaps indicated as including each character contained in the inputted search term;

wherein if the search term includes a plurality of words and indicates a positional relationship between the words, the method further comprises the step of:

searching the structured documents identified by the first document identifiers and identifying a plurality of second document identifiers containing all the words having the positional relationship defined in the inputted search term.

6. A method according to claim 1, wherein the structured document stored in step a) is segmented according to the predetermined markers, each segment corresponds to one of the logical structures, the segmented document includes all text within the structured document, and the step of searching the structured documents includes:

searching each segment of the structured documents corresponding to the input discriminator and the second document identifiers and identifying a plurality of third document identifiers corresponding to the structured documents which include the document identifiers in the search term.

7. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) creating a segmented structured document according to the predetermined markers, each segment corresponding to one of the logical structures, the segmented document being stored in a database and including all text within the structured document;

b) creating, and storing in the database, condensed texts for each of the respective logical structures, each of the condensed texts being formed by segmenting the structured document according to the predetermined markers and including all words within the respective logical structure without duplication; and c) creating, and storing in the database, a character occurrence bitmap including all characters from the structured document without duplication;

inputting a search term and a discriminator;

searching the character occurrence bitmap for each of the structured documents and identifying a plurality of first document identifiers corresponding to the character occurrence bitmaps indicated as including each character contained in the search term; and searching the condensed texts corresponding to the input discriminator and the first document identifiers and further identifying a plurality of second document identifiers corresponding to the condensed texts which include each word contained in the search term;

wherein if the search term includes a plurality of words and indicates a positional relationship between the words, the method further comprises the step of:

searching each segment of the structured documents corresponding to the input discriminator and the second document identifiers and identifying a plurality of third document identifiers corresponding to the structured documents containing all the words having the positional relationship defined in the inputted search term.

8. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) creating a segmented structured document according to the predetermined markers, each segment corresponding to one of the logical structures, the segmented document being stored in a database and including all text within the structured document; and b) creating, and storing in the database, a character occurrence bitmap including all characters from the structured document without duplication;

inputting a search term and a discriminator; and searching the character occurrence bitmap for each of the structured documents and identifying a plurality of first document identifiers corresponding to the character occurrence bitmaps indicated as including each character contained in the search term;

wherein if the search term includes a plurality of words and indicates a positional relationship between the words, the method further comprises the step of:

searching each segment of the structured documents corresponding to the input discriminator and the first document identifiers and identifying a plurality of second document identifiers corresponding to the structured documents containing all the words having the positional relationship defined in the inputted search term.

9. A text search method for searching structured documents, each structured document having a plurality of logical structures, each logical structure being enclosed by predetermined markers and having a unique discriminator for identifying the logical structure, comprising the steps of:

preparing each of the structured documents to be searched, each structured document being identified by a document identifier, the preparing step for each structured document including:

a) creating a segmented structured document using the predetermined markers, each segment corresponding to one of the logical structures, the segmented document being stored in a database and including all text within the structured document; and b) creating, and storing in the database, condensed texts for each of the respective logical structures, each of the condensed texts being formed by segmenting the structured document according to the predetermined markers and including all words within the respective logical structure without duplication;

inputting a search term and a discriminator; and searching the condensed texts corresponding to the input discriminator and identifying a plurality of first document identifiers corresponding to the condensed texts which include each word contained in the inputted search term;

wherein if the search term includes a plurality of words and indicates a positional relationship between the words, the method further comprises the step of:

searching each segment of the structured documents corresponding to the input discriminator and the first document identifiers and identifying a plurality of second document identifiers corresponding to the structured documents containing all the words having the positional relationship defined in the inputted search term.

10. A structured document search apparatus for searching structured documents having a plurality of logical structures, each logical structure being enclosed by predetermined markers and having a unique discriminator for identifying the logical structure, comprising:

means for storing each of the structured documents in a database;

means for creating, and storing in the database, condensed texts and the corresponding unique discriminators for each of a plurality of segments, identified by the predetermined markers, in each structured document, each condensed text including all words, without duplication, within one segment;

means for creating, and storing in the database, a plurality of character occurrence bitmaps, each character occurrence bitmap containing all characters, without duplication, contained in one of the structured documents;

means for searching the character occurrence bitmaps and identifying a plurality of first document identifiers identifying respective structured documents including all characters contained in a search term of an inputted search equation;

means for searching the condensed texts, identified by the first plurality of document identifiers and a discriminator included in the search equation, and identifying a plurality of second document identifiers corresponding to the condensed texts which include each word contained in the search term; and means for, if the search equation designates a positional relationship between a plurality of search terms, searching the structured documents identified by the plurality of second document identifiers and identifying a plurality of third document identifiers corresponding to the structured documents which include all words in the inputted search term having the designated positional relationship.

11. A structured document search apparatus for searching structured documents having a plurality of logical structures, each logical structure being enclosed by predetermined markers and having a unique discriminator for identifying the logical structure, comprising:

means for storing each of the structured documents in a database;

means for creating, and storing in the database, condensed texts and the corresponding unique discriminators for each of a plurality of segments, identified by the predetermined markers, in each structured document, each condensed text including all words, without duplication, within one segment;

means for searching the condensed texts, identified by a discriminator included in an inputted search equation, and identifying a plurality of first document identifiers corresponding to the condensed texts which include each word contained in a search term of the search equation; and means for, if the search equation designates a positional relationship between a plurality of search terms, searching the structured documents identified by the plurality of first document identifiers and identifying a plurality of second document identifiers corresponding to the structured documents which include all words in the inputted search term having the designated positional relationship.

12. A structured document search apparatus for searching structured documents having a plurality of logical structures, each logical structure being enclosed by predetermined markers and having a unique discriminator for identifying the logical structure, comprising:

means for storing each of the structured documents in a database;

means for creating, and storing in the database, condensed texts and the corresponding unique discriminators for each of a plurality of segments, identified by the predetermined markers, in each structured document, each condensed text including all words, without duplication, within one segment;

means for creating, and storing in the database, a plurality of character occurrence bitmaps and the corresponding unique discriminators for each of a plurality of segments, identified by the predetermined markers, in each structured document, each character occurrence bitmap containing all characters, without duplication, within one segment;

means for searching the character occurrence bitmaps, identified by a discriminator in an inputted search equation, and identifying a plurality of first document identifiers corresponding to the character occurrence bitmaps which include each character contained in a search term of the inputted search equation;

means for searching the condensed texts, identified by the first document identifiers and the discriminator included in the search equation, and identifying a plurality of second document identifiers corresponding to the condensed texts which include each word contained in the search term of the search equation; and means for, if the search equation designates a positional relationship between a plurality of search terms, searching the structured documents identified by the plurality of second document identifiers and identifying a plurality of third document identifiers corresponding to the structured documents which include all words in the inputted search term having the designated positional relationship.

13. A structured document search apparatus for searching structured documents having a plurality of logical structures, each logical structure being enclosed by predetermined markers and having a unique discriminator for identifying the logical structure, comprising:

means for storing each of the structured documents in a database;

means for creating, and storing in the database, a condensed text for each of the structured documents, each condensed text including all words, without duplication, within one structured document;

means for creating, and storing in the database, a plurality of character occurrence bitmaps and the corresponding unique discriminators for each of a plurality of segments, identified by the predetermined markers, in each structured document, each character occurrence bitmap containing all characters, without duplication, within one segment;

means for searching the character occurrence bitmaps, identified by a discriminator in an inputted search equation, and identifying a plurality of first document identifiers corresponding to the character occurrence bitmaps which include each character contained in a search term of the inputted search equation;

means for searching the condensed texts, identified by the first document identifiers, and identifying a plurality of second document identifiers corresponding to the condensed texts which include each word contained in the search term of the search equation; and means for, if the search equation designates a positional relationship between a plurality of search terms, searching the structured documents identified by the plurality of second document identifiers and identifying a plurality of third document identifiers corresponding to the structured documents which include all words in the inputted search term having the designated positional relationship.

14. A structured document search apparatus for searching structured documents having a plurality of logical structures, each logical structure being enclosed by predetermined markers and having a unique discriminator for identifying the logical structure, comprising:
- means for storing each of the structured documents in a database;
- means for creating, and storing in the database, a plurality of character occurrence bitmaps and the corresponding unique discriminators for each of a plurality of segments, identified by the predetermined markers, in each structured document, each character occurrence bitmap containing all characters, without duplication, within one segment;
- means for searching the character occurrence bitmaps, identified by a discriminator in an inputted search equation, and identifying a plurality of first document identifiers corresponding to the character occurrence bitmaps which include each character contained in a search term of the inputted search equation; and
- means for, if the search equation designates a positional relationship between a plurality of search terms, searching the structured documents identified by the plurality of first document identifiers and identifying a plurality of second document identifiers corresponding to the structured documents which include all words in the inputted search term having the designated positional relationship.

15. A structured document search apparatus according to claim 10, wherein:
- the means for storing the structured documents segments each structured document according to the predetermined markers, each segment corresponding to one of the logical structures, the segmented document including all text within the structured document; and
- the means for searching the structured documents searches the segments of the documents identified by the plurality of second document identifiers and the discriminator included in the search equation, and identifies a plurality of third document identifiers corresponding to the structured documents which include all words in the inputted search term having the designated positional relationship.

16. A structured document search system for searching structured documents having a plurality of logical structures, each logical structure being enclosed by predetermined markers and having a unique discriminator for identifying the logical structure, comprising:
- means for creating, and storing in a database, a segmented structured document, each segment identified by the predetermined markers and corresponding to one of the logical structures, the segmented document including all text within the structured document;
- means for creating, and storing in the database, condensed texts and the corresponding unique discriminators for each of the plurality of segments, identified by the predetermined markers, in each structured document, each condensed text including all words, without duplication, within one segment;
- means for creating, and storing in the database, a plurality of character occurrence bitmaps, each character occurrence bitmap containing all characters, without duplication, contained in one of the structured documents;
- means for searching the character occurrence bitmaps and identifying a plurality of first document identifiers identifying respective structured documents including all characters contained in a search term of an inputted search equation;
- means for searching the condensed texts, identified by the first document identifiers and a discriminator included in the search equation, and identifying a plurality of second document identifiers corresponding to the condensed texts which include each word contained in the search term of the search equation; and
- means for, if the search equation designates a positional relationship between a plurality of search terms, searching the segments of the structured documents identified by the plurality of second document identifiers and the discriminator included in the search equation, and identifying a plurality of third document identifiers corresponding to the structured documents which include all words in the inputted search term having the designated positional relationship.

17. A structured document search apparatus for searching structured documents having a plurality of logical structures, each logical structure being enclosed by predetermined markers and having a unique discriminator for identifying the logical structure, comprising:
- means for creating, and storing in a database, a segmented structured document, each segment being identified by the predetermined markers and corresponding to one of the logical structures, the segmented document including all text within the structured document;
- means for creating, and storing in the database, a plurality of character occurrence bitmaps, each character occurrence bitmap containing all characters, without duplication, contained in one of the structured documents;
- means for searching the character occurrence bitmaps and identifying a plurality of first document identifiers identifying respective structured documents including all characters contained in a search term of an inputted search equation; and
- means for, if the search equation designates a positional relationship between a plurality of search terms, searching the segments of the structured documents identified by the plurality of first document identifiers and the discriminator included in the search equation, and identifying a plurality of second document identifiers corresponding to the structured documents which include all words in the inputted search term having the designated positional relationship.

18. A structured document search system for searching structured documents having a plurality of logical structures, each logical structure being enclosed by predetermined markers and having a unique discriminator for identifying the logical structure, comprising:
- means for creating, and storing in a database, a segmented structured document, each segment being identified by the predetermined markers and corresponding to one of the logical structures, the segmented document including all text within the structured document;
- means for creating, and storing in the database, condensed texts and the corresponding unique discriminators for each of the plurality of segments, identified by the predetermined markers, in each structured document, each condensed text including all words, without duplication, within one segment;
- means for searching the condensed texts, identified by a discriminator included in an inputted search equation, and identifying a plurality of first document identifiers corresponding to the condensed texts which include each word contained in a search term of the search equation; and means for, if the search equation designates a positional relationship between a plurality of search terms, searching the segments of the structured documents identified by the plurality of first document identifiers and the discriminator included in the search equation, and identifying a plurality of second document identifiers corresponding to the structured documents which include all words in the inputted search term having the designated positional relationship.

19. A text search method for searching structured documents, each structured document having a plurality of logical structures, each logical structure being enclosed by predetermined markers and having a unique discriminator for identifying the logical structure, comprising the steps of:

a) preparing a search database, including:

a1) scanning each of the structured documents, including;

a2) detecting a first predetermined marker indicating a start of one of the logical structures within a structured document;

a3) detecting a second predetermined marker, indicating an end of the logical structure, and calculating a length of the logical structure from the first and second predetermined markers;

a4) repeating steps a2) to a4) until an end of the structured document is detected;

a5) storing, in the search database, a control code indicating a start of the structured document and an identifier for identifying the structured document;

a6) storing, in the search database, the first detected predetermined marker, the unique discriminator, the calculated logical structure length and corresponding logical structure text, for each logical structure in the structured document;

a7) storing, in the search database, a control code indicating an end of the structured document; and a8) repeating steps a1) to a8) for each of the structured documents;

b) inputting a discriminator, identifying a logical structure, and a search term; and c) searching the search database and comparing the input discriminator to each of the discriminators stored in the search database, including:

c1) if the stored discriminator includes the input discriminator, performing character matching between the search term and the logical structure text corresponding to the stored discriminator;

c2) if the stored discriminator does not include the input discriminator, skipping an amount of logical structure text equal to the logical structure length; and c3) repeating steps c1) to c3) for each of the stored discriminators in the search database.

20. A method according to claim 19, wherein the first predetermined marker is a specific control code and the unique discriminators for the logical structures include identification numbers.

21. A method according to claim 20, wherein the identification numbers are hierarchically defined.

22. A text search method for searching structured documents, each structured document having a plurality of logical structures, each logical structure being enclosed by predetermined markers and having a unique discriminator for identifying the logical structure, comprising the steps of:

a) creating a search database by creating a logical structure information file and a text file, the text file storing text for each logical structure in the structured documents, the logical structure information file storing logical structure discriminator information and area information indicating where the text of each logical structure of each structured document is stored in the text file, including:

a1) detecting a first predetermined marker indicating a start of one of the logical structures within a structured document;

a2) detecting a second predetermined marker indicating an end of the logical structure;

a3) storing the text of the logical structure in the text file;

a4) storing, in the logical structure information file, the logical structure discriminator information and the area information indicating where the text for the respective discriminator is stored in the text file;

a5) repeating steps a1) to a4) for each of the logical structures in the structured document; and a6) repeating steps a1) to a5) for each structured document; and b) searching the search database, including:

b1) referring to the logical structure information file and reading the area information indicating where the text of a structured document for a logical structure designated in a search equation is stored in the text file;

b2) reading the text of the structured document corresponding to the logical structure designated in the search equation, from the text file, in accordance with the area information;

b3) performing a character string matching process for the read text of the structured document by using a search term designated in the search equation; and b4) repeating steps b1) to b4) for each structured document.

* * * * *